United States Patent
Huang

(10) Patent No.: US 12,535,652 B2
(45) Date of Patent: Jan. 27, 2026

(54) OPTICAL LENS ASSEMBLY AND PHOTOGRAPHING MODULE

(71) Applicant: NEWMAX TECHNOLOGY CO., LTD., Taichung (TW)

(72) Inventor: Ching-Yun Huang, Taichung (TW)

(73) Assignee: NEWMAX TECHNOLOGY CO., LTD., Taichung (TW)

(*) Notice: Subject to any disclaimer, the term of this patent is extended or adjusted under 35 U.S.C. 154(b) by 823 days.

(21) Appl. No.: 17/721,542

(22) Filed: Apr. 15, 2022

(65) Prior Publication Data

US 2023/0244060 A1    Aug. 3, 2023

(30) Foreign Application Priority Data

Jan. 28, 2022   (TW) ................................ 111103931

(51) Int. Cl.
*G02B 9/62* (2006.01)
*G03B 17/12* (2021.01)

(52) U.S. Cl.
CPC .............. *G02B 9/62* (2013.01); *G03B 17/12* (2013.01)

(58) Field of Classification Search
CPC .................................. G02B 9/62; G03B 17/12
USPC .......................................................... 359/696
See application file for complete search history.

(56) References Cited

U.S. PATENT DOCUMENTS

2021/0389569 A1* 12/2021 Lee .................... G02B 13/0045

* cited by examiner

*Primary Examiner* — Bumsuk Won
*Assistant Examiner* — Grant A Gagnon
(74) *Attorney, Agent, or Firm* — Juan Carlos A. Marquez; Marquez IP Law Office, PLLC

(57) ABSTRACT

An optical lens assembly includes, in order from an object-side to an image-side: a first lens, a stop, a second lens, a third lens, a fourth lens, a fifth lens, and a sixth lens, wherein half of a maximum field of view of the optical lens assembly is HFOV, an f-number of the optical lens assembly is Fno, a distance from an object-side surface of the first lens to an image plane along an optical axis is TL, a maximum image height of the optical lens assembly is IMH, a focal length of the optical lens assembly is f, a focal length of the first lens is f1, and the following conditions are satisfied: $0.73 < \text{HFOV}/(\text{INM}*\text{Fno}*\text{TL}) < 1.67$, and $-0.58 < f/f1 < -0.30$.

19 Claims, 13 Drawing Sheets

FIELD CURVATURE  DISTORTION

MILLIMETERS
FIELD UNITS CHANGED TO
FIELD ANGLE

PERCENT

OPTICAL LENS ASSEMBLY AND PHOTOGRAPHING MODULE

CROSS-REFERENCE TO RELATED APPLICATION

This application claims the benefit of Taiwan Patent Application No. 111103931, filed on Jan. 28, 2022, which is hereby incorporated by reference for all purposes as if fully set forth herein.

BACKGROUND

Technical Field

The present disclosure relates to an optical lens assembly and a photographing module, and in particular, to an optical lens assembly and a photographing module applicable to an electronic device.

Related Art

Due to the advancement of semiconductor process technologies, miniaturized optical lens module enter the field of high image resolution. Today, ultra-wide-angle lens modules are applicable to various fields, such as photography, security monitors, and around view monitors, wherein the image resolution requirement of the ultra-wide-angle lens module for a mobile phone is constantly raised. Therefore, the ultra-wide-angle lens with high image resolution becomes an important research direction.

Conventionally, ultra-wide-angle lens modules with image resolution of mostly 10 M to 20 M are mounted on portable electronic devices such as mobile phones and tablet computers, and other wearable electronic devices. There are very few ultra-wide-angle lens modules with ultra-high image resolution above 50 M on the market, because a large optical aperture is prone to be accompanied by a sensitivity problem in manufacturing and assembly, difficult mass production and increased cost are caused.

SUMMARY

An objective of the present disclosure is to resolve the above problems of high image resolution and large wide angle in the prior art. To achieve the above objective, the present disclosure provides an optical lens assembly, in order from an object-side to an image-side, comprising: a first lens with negative refractive power, comprising an object-side surface and an image-side surface, the object-side surface of the first lens being concave near an optical axis, and the image-side surface of the first lens being concave near the optical axis; a stop; a second lens with positive refractive power, comprising an object-side surface and an image-side surface, the object-side surface of the second lens being convex near the optical axis, and the image-side surface of the second lens being convex near the optical axis; a third lens with negative refractive power, comprising an object-side surface and an image-side surface, the object-side surface of the third lens being convex near the optical axis, and the image-side surface of the third lens being concave near the optical axis; a fourth lens with positive refractive power, comprising an object-side surface and an image-side surface, the object-side surface of the fourth lens being convex near the optical axis, and the image-side surface of the fourth lens being concave near the optical axis; a fifth lens with positive refractive power, comprising an object-side surface and an image-side surface, the image-side surface of the fifth lens being convex near the optical axis; and a sixth lens with negative refractive power, comprising an object-side surface and an image-side surface, the object-side surface of the sixth lens being convex near the optical axis, and the image-side surface of the sixth lens being concave near the optical axis.

Half of a maximum field of view of the optical lens assembly is HFOV, an f-number of the optical lens assembly is Fno, a distance from the object-side surface of the first lens to an image plane along the optical axis is TL, a maximum image height of the optical lens assembly is IMH (IMH is usually half of a diagonal length of an effective pixel region of an image sensor, but may be less than or greater than half of the diagonal length of the effective pixel region of the image sensor due to a usage feature of an electronic product), a focal length of the optical lens assembly is f, a focal length of the first lens is f1, and the following conditions are satisfied: $0.73<HFOV/(IMH*Fno*TL)<1.67$, and $-0.58<f/f1<-0.30$.

When the optical lens assembly satisfies $0.73<HFOV/(IMH*Fno*TL)<1.67$, with the proper configuration, the effect of taking into account a wide-angle feature, that is, a large optical aperture lens with high image resolution can be achieved. When the optical lens assembly satisfies $-0.58<f/f1<-0.30$, with the proper configuration of the focal length of the first lens and the focal length of the optical lens assembly, the wide-angle feature can be effectively enhanced, a larger field of view can be provided, and the illuminance of the optical lens assembly can be maintained.

A total quantity of lenses with refractive power in the optical lens assembly is six.

A curvature radius of the object-side surface of the first lens is R1, a curvature radius of the image-side surface of the first lens is R2, and the following condition is satisfied: $-1.24<R1/R2<-0.31$. With the preferable lens curvature configuration, the wide-angle feature can be satisfied and the relative illuminance of the optical lens assembly can be improved.

A central thickness of the third lens along the optical axis is CT3, a curvature radius of the object-side surface of the third lens is R5, a curvature radius of the image-side surface of the third lens is R6, and the following condition is satisfied: $0.31<CT3*(R5/R6)<0.76$. With the proper configuration of the curvature and central thickness of the third lens, chromatic aberration can be corrected and the image quality can be improved.

A focal length of the optical lens assembly is f, a focal length of the sixth lens is f6, and the following condition is satisfied: $-1.09<f/f6<-0.58$. With the proper configuration of the focal length of the sixth lens and the focal length of the optical lens assembly, optical distortion can be alleviated.

A focal length of the first lens is f1, a focal length of the third lens is f3, a focal length of the sixth lens is f6, and the following condition is satisfied: $-11.04<f3*f6/f1<-3.24$. With the proper configuration of the refractive power of the optical lens assembly, the image resolution of the optical lens assembly can be increased.

A focal length of the third lens is f3, a focal length of the fourth lens is f4, a focal length of the fifth lens is f5, and the following condition is satisfied: $-3.68<f4/(f3*f5)<-0.42$. With the proper configuration of the refractive power of the optical lens assembly, aberration of the optical lens assembly can be corrected, so as to improve the image quality of the optical lens assembly.

A central thickness of the third lens along the optical axis is CT3, a central thickness of the fourth lens along the optical axis is CT4, a central thickness of the fifth lens along the optical axis is CT5, a central thickness of the sixth lens along the optical axis is CT6, and the following condition is satisfied: $1.50<(CT4+CT5)/(CT3+CT6)<2.58$. Therefore, by properly adjusting the allocation of the central thicknesses of the lenses, both the performance of the optical lens assembly and the lens formability can be taken into account.

A central thickness of the first lens along the optical axis is CT1, a central thickness of the sixth lens along the optical axis is CT6, a distance from the image-side surface of the first lens to the stop along the optical axis is T1S, and the following condition is satisfied: $0.54<(CT1+CT6)/T1S<1.10$. By properly adjusting the central thickness of the first lens and the central thickness of the sixth lens, space of the optical lens assembly can be optimized.

A distance from the object-side surface of the first lens to an image plane along the optical axis is TL, a maximum image height of the optical lens assembly is IMH (IMH is usually half of a diagonal length of an effective pixel region of an image sensor, but may be less than or greater than half of the diagonal length of the effective pixel region of the image sensor due to a usage feature of an electronic product), and the following condition is satisfied: $1.52<TL/IMH<2.34$. Therefore, a height of the optical lens assembly and the aspect ratio of an image are proper, to achieve the effect of high image resolution and miniaturization.

A distance from the object-side surface of the first lens to the image plane along the optical axis is TL, a distance from the image-side surface of the sixth lens to the image plane along the optical axis is BFL, the focal length of the optical lens assembly is f, and the following condition is satisfied: $1.75<(TL-BFL)/f<3.27$. Therefore, proper lens space and back focus space are provided.

A maximum image height of the optical lens assembly is IMH, a central thickness of the first lens along the optical axis is CT1, a central thickness of the third lens along the optical axis is CT3, and the following condition is satisfied: $3.52<IMH/(CT1+CT3)<6.15$. Therefore, a high image resolution requirement is provided and meanwhile the formability of the lenses is taken into account.

A central thickness of the second lens along the optical axis is CT2, a central thickness of the fifth lens along the optical axis is CT5, a focal length of the second lens is f2, a focal length of the fifth lens is f5, and the following condition is satisfied: $1.76<(f2/CT2)-(f5/CT5)<3.26$. Therefore, the refractive power of the lenses and the formability of the lenses are balanced.

An Abbe number of the third lens is vd3, an Abbe number of the fourth lens is vd4, and the following condition is satisfied: $29.4<vd4-vd3<45.4$. With the proper configuration of the Abbe number of the third lens and the Abbe number of the fourth lens, aberration of the optical lens assembly can be corrected and the image quality of the optical lens assembly can be improved.

An Abbe number of the fifth lens is vd5, an Abbe number of the sixth lens is vd6, a focal length of the fifth lens is f5, a focal length of the sixth lens is f6, and the following condition is satisfied: $24.2<|vd5/f5-vd6/f6|<48.5$. Through a selection of lens materials and the proper configuration of the refractive power, higher-order aberration can be reduced.

A focal length of the first lens is f1, a focal length of the second lens is f2, and the following condition is satisfied: $-2.37<f1/f2<-1.03$. With the proper allocation of the refractive power of the optical lens assembly, the sensitivity of the first lens and the second lens can be reduced.

A focal length of the third lens is f3, a focal length of the fifth lens is f5, and the following condition is satisfied: $-7.16<f3/f5<-3.71$. With the proper allocation of the refractive power of the optical lens assembly, aberration of the optical lens assembly can be corrected, so as to improve the image quality of the optical lens assembly.

In addition, the present disclosure further provides a photographing module, comprising: a lens barrel; an optical lens assembly disposed in the lens barrel; and an image sensor disposed on an image plane of the optical lens assembly.

The optical lens assembly, in order from an object-side to an image-side, comprises: a first lens with negative refractive power, comprising an object-side surface and an image-side surface, the object-side surface of the first lens being concave near an optical axis, and the image-side surface of the first lens being concave near the optical axis; a stop; a second lens with positive refractive power, comprising an object-side surface and an image-side surface, the object-side surface of the second lens being convex near the optical axis, and the image-side surface of the second lens being convex near the optical axis; a third lens with negative refractive power, comprising an object-side surface and an image-side surface, the object-side surface of the third lens being convex near the optical axis, and the image-side surface of the third lens being concave near the optical axis; a fourth lens with positive refractive power, comprising an object-side surface and an image-side surface, the object-side surface of the fourth lens being convex near the optical axis, and the image-side surface of the fourth lens being concave near the optical axis; a fifth lens with positive refractive power, comprising an object-side surface and an image-side surface, the image-side surface of the fifth lens being convex near the optical axis; and a sixth lens with negative refractive power, comprising an object-side surface and an image-side surface, the object-side surface of the sixth lens being convex near the optical axis, and the image-side surface of the sixth lens being concave near the optical axis.

Half of a maximum field of view of the optical lens assembly is HFOV, an f-number of the optical lens assembly is Fno, a distance from the object-side surface of the first lens to an image plane along the optical axis is TL, a maximum image height of the optical lens assembly is IMH (IMH is usually half of a diagonal length of an effective pixel region of an image sensor, but may be less than or greater than half of the diagonal length of the effective pixel region of the image sensor due to a usage feature of an electronic product), a focal length of the optical lens assembly is f, a focal length of the first lens is f1, and the following conditions are satisfied: $0.73<HFOV/(INM*Fno*TL)<1.67$, and $-0.58<f/f1<-0.30$.

When the optical lens assembly satisfies $0.73<HFOV/(IMH*Fno*TL)<1.67$, with the proper configuration, the effect of taking into account a wide-angle feature, that is, a large optical aperture lens with high image resolution can be achieved. When the optical lens assembly satisfies $-0.58<f/f1<-0.30$, with the proper configuration of the focal length of the first lens and the focal length of the optical lens assembly, the wide-angle feature can be effectively enhanced, a larger field of view can be provided, and the illuminance of the optical lens assembly can be maintained.

A total quantity of lenses with refractive power in the optical lens assembly is six.

A curvature radius of the object-side surface of the first lens is R1, a curvature radius of the image-side surface of the first lens is R2, and the following condition is satisfied:

$-1.24<R1/R2<-0.31$. With the preferable lens curvature configuration, the wide-angle feature can be satisfied and the relative illuminance of the optical lens assembly can be improved.

A central thickness of the third lens along the optical axis is CT3, a curvature radius of the object-side surface of the third lens is R5, a curvature radius of the image-side surface of the third lens is R6, and the following condition is satisfied: $0.31<CT3*(R5/R6)<0.76$. With the proper configuration of the curvature and central thickness of the third lens, chromatic aberration can be corrected and the image quality can be improved.

A focal length of the optical lens assembly is f, a focal length of the sixth lens is f6, and the following condition is satisfied: $-1.09<f/f6<-0.58$. With the proper configuration of the focal length of the sixth lens and the focal length of the optical lens assembly, optical distortion can be alleviated.

A focal length of the first lens is f1, a focal length of the third lens is f3, a focal length of the sixth lens is f6, and the following condition is satisfied: $-11.04<f3*f6/f1<-3.24$. With the proper configuration of the refractive power of the optical lens assembly, the image resolution of the optical lens assembly can be increased.

A focal length of the third lens is f3, a focal length of the fourth lens is f4, a focal length of the fifth lens is f5, and the following condition is satisfied: $-3.68<f4/(f3*f5)<-0.42$. With the proper configuration of the refractive power of the optical lens assembly, aberration of the optical lens assembly can be corrected, so as to improve the image quality of the optical lens assembly.

A central thickness of the third lens along the optical axis is CT3, a central thickness of the fourth lens along the optical axis is CT4, a central thickness of the fifth lens along the optical axis is CT5, a central thickness of the sixth lens along the optical axis is CT6, and the following condition is satisfied: $1.50<(CT4+CT5)/(CT3+CT6)<2.58$. Therefore, by properly adjusting the allocation of the central thicknesses of the lenses, both the performance of the optical lens assembly and the lens formability can be taken into account.

A central thickness of the first lens along the optical axis is CT1, a central thickness of the sixth lens along the optical axis is CT6, a distance from the image-side surface of the first lens to the stop along the optical axis is T1S, and the following condition is satisfied: $0.54<(CT1+CT6)/T1S<1.10$. By properly adjusting the central thickness of the first lens and the central thickness of the sixth lens, space of the optical lens assembly can be optimized.

A distance from the object-side surface of the first lens to an image plane along the optical axis is TL, a maximum image height of the optical lens assembly is IMH (IMH is usually half of a diagonal length of an effective pixel region of an image sensor, but may be less than or greater than half of the diagonal length of the effective pixel region of the image sensor due to a usage feature of an electronic product), and the following condition is satisfied: $1.52<TL/IMH<2.34$. Therefore, a height of the optical lens assembly and the aspect ratio of an image are proper, to achieve the effect of high image resolution and miniaturization.

A distance from the object-side surface of the first lens to the image plane along the optical axis is TL, a distance from the image-side surface of the sixth lens to the image plane along the optical axis is BFL, the focal length of the optical lens assembly is f, and the following condition is satisfied: $1.75<(TL-BFL)/f<3.27$. Therefore, proper lens space and back focus space are provided.

A maximum image height of the optical lens assembly is IMH, a central thickness of the first lens along the optical axis is CT1, a central thickness of the third lens along the optical axis is CT3, and the following condition is satisfied: $3.52<IMH/(CT1+CT3)<6.15$. Therefore, a high image resolution requirement is provided and meanwhile the formability of the lenses is taken into account.

A central thickness of the second lens along the optical axis is CT2, a central thickness of the fifth lens along the optical axis is CT5, a focal length of the second lens is f2, a focal length of the fifth lens is f5, and the following condition is satisfied: $1.76<(f2/CT2)-(f5/CT5)<3.26$. Therefore, the refractive power of the lenses and the formability of the lenses are balanced.

An Abbe number of the third lens is vd3, an Abbe number of the fourth lens is vd4, and the following condition is satisfied: $29.4<vd4-vd3<45.4$. With the proper configuration of the Abbe number of the third lens and the Abbe number of the fourth lens, aberration of the optical lens assembly can be corrected and the image quality of the optical lens assembly can be improved.

An Abbe number of the fifth lens is vd5, an Abbe number of the sixth lens is vd6, a focal length of the fifth lens is f5, a focal length of the sixth lens is f6, and the following condition is satisfied: $24.2<|vd5/f5-vd6/f6|<48.5$. Through a selection of lens materials and the proper configuration of the refractive power, higher-order aberration can be reduced.

A focal length of the first lens is f1, a focal length of the second lens is f2, and the following condition is satisfied: $-2.37<f1/f2<-1.03$. With the proper allocation of the refractive power of the optical lens assembly, the sensitivity of the first lens and the second lens can be reduced.

A focal length of the third lens is f3, a focal length of the fifth lens is f5, and the following condition is satisfied: $-7.16<f3/f5<-3.71$. With the proper allocation of the refractive power of the optical lens assembly, aberration of the optical lens assembly can be corrected, so as to improve the image quality of the optical lens assembly.

The optical lens assembly and the photographing module of the present disclosure are applicable to an electronic device requiring length shorter than that of the photographing module and having an ultra-wide-angle lens module with high image resolution. In addition, the optical lens assembly and the photographing module of the present disclosure have a large optical aperture of 2.2 or 2.0 to provide a larger amount of light, and the image resolution can be greatly improved to 50 M.

DETAILED DESCRIPTION

To enable a person with ordinary skills in the art to understand the content of the present disclosure and implement the content of the present disclosure, appropriate embodiments are described below with reference to the diagrams, and all equivalent replacements and modifications based on the content of the present disclosure are intended to be included within the scope of rights of the present disclosure. In addition, it is stated that the drawings attached to the present disclosure are not depicted in actual sizes. Although the present disclosure provides examples of specific parameters, it should be understood that parameters need not be completely equal to corresponding values. Within an acceptable error range, which is similar to its corresponding parameter, the embodiments below will further describe in detail the technical content of the present disclosure, but the disclosed content is not intended to limit the scope of rights of the present disclosure.

First Embodiment

Figure 1A:
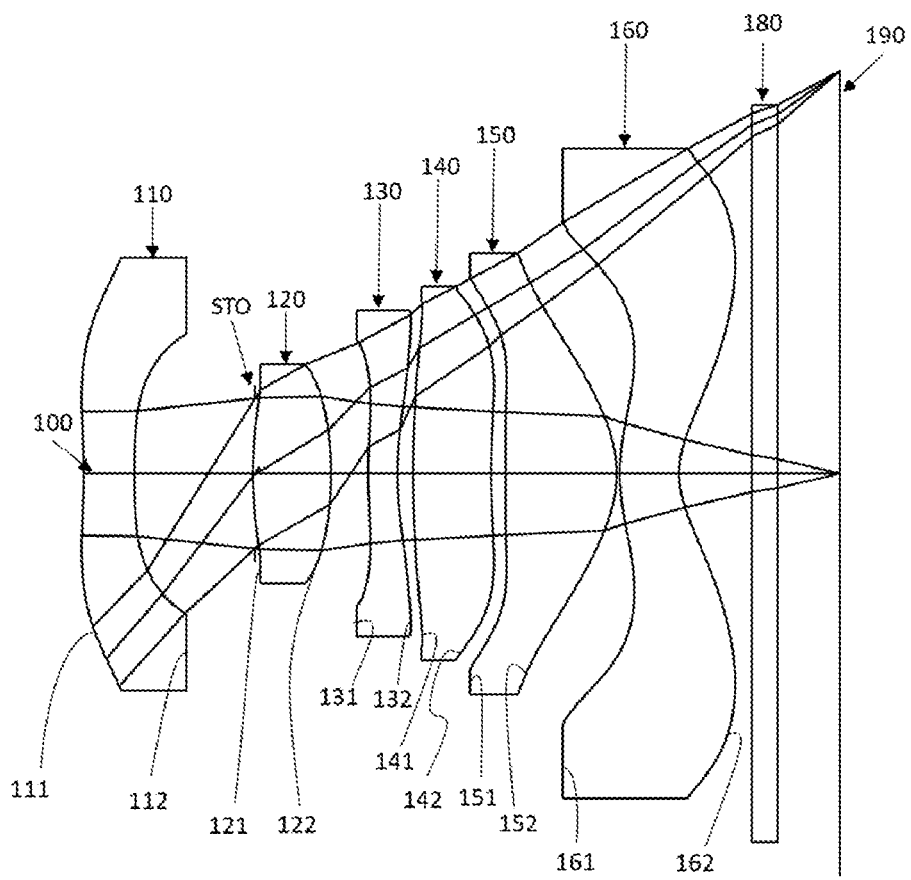
FIG. 1A is a schematic view of an optical lens assembly according to a first embodiment of the present disclosure.
Figure 1B:
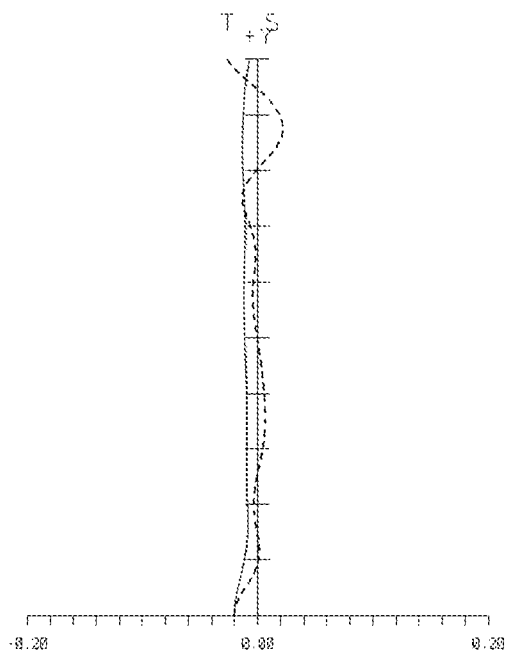
FIG. 1B sequentially shows a field curvature curve and a distortion curve of the optical lens assembly according to the first embodiment.
Figure 1B:
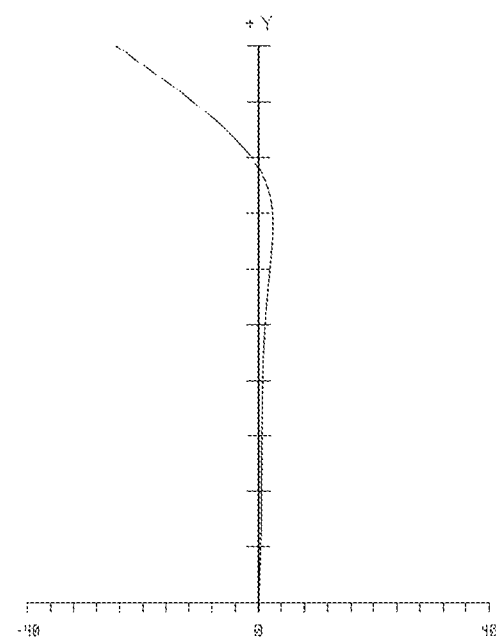

FIG. 1A is a schematic view of an optical lens assembly according to the first embodiment of the present disclosure. FIG. 1B sequentially shows a field curvature curve and a distortion curve of the optical lens assembly according to the first embodiment. It can be seen from FIG. 1A that the optical lens assembly includes, in order from an object-side to an image-side: a first lens 110, a stop STO, a second lens 120, a third lens 130, a fourth lens 140, a fifth lens 150, a sixth lens 160, an IR-cut (infrared-cut) filter 180, and an image plane 190. A total quantity of lenses with refractive power in the optical lens assembly is six, but not limited thereto.

The first lens 110 with negative refractive power is made of a plastic material and includes an object-side surface 111 and an image-side surface 112, wherein the object-side surface 111 of the first lens 110 is concave near an optical axis 100, the image-side surface 112 of the first lens 110 is concave near the optical axis 100, and the object-side surface 111 and image-side surface 112 both are aspheric.

The second lens 120 with positive refractive power is made of a plastic material and includes an object-side surface 121 and an image-side surface 122, wherein the object-side surface 121 of the second lens 120 is convex near the optical axis 100, the image-side surface 122 of the second lens 120 is convex near the optical axis 100, and the object-side surface 121 and image-side surface 122 both are aspheric.

The third lens 130 with negative refractive power is made of a plastic material and includes an object-side surface 131 and an image-side surface 132, wherein the object-side surface 131 of the third lens 130 is convex near the optical axis 100, the image-side surface 132 of the third lens 130 is concave near the optical axis 100, and the object-side surface 131 and image-side surface 132 both are aspheric.

The fourth lens 140 with positive refractive power is made of a plastic material, including an object-side surface 141 and an image-side surface 142, wherein the object-side surface 141 of the fourth lens 140 is convex near the optical axis 100, the image-side surface 142 of the fourth lens 140 is concave near the optical axis 100, and the object-side surface 141 and image-side surface 142 both are aspheric.

The fifth lens 150 with positive refractive power is made of a plastic material and includes an object-side surface 151 and an image-side surface 152, wherein the object-side surface 151 of the fifth lens 150 is concave near the optical axis 100, the image-side surface 152 of the fifth lens 150 is convex near the optical axis 100, and the object-side surface 151 and image-side surface 152 both are aspheric.

The sixth lens 160 with positive refractive power is made of a plastic material and includes an object-side surface 161 and an image-side surface 162, wherein the object-side surface 161 of the sixth lens 160 is convex near the optical axis 100, the image-side surface 162 of the sixth lens 160 is concave near the optical axis 100, and the object-side surface 161 and image-side surface 162 both are aspheric.

The IR-cut filter 180 is made of glass, and is disposed between the sixth lens 160 and the image plane 190 without affecting a focal length of the optical lens assembly. It can be understood that the IR-cut filter 180 may also be formed on the surface of the above-mentioned lens, and the IR-cut filter 180 may also be made of other materials.

Aspheric curve equations of the above-mentioned lenses are expressed as follows:

$$z(h) = \frac{ch^2}{1 + [1 - (k+1)c^2h^2]^{0.5}} + \sum (A_i) \cdot (h^i)$$

wherein, z is a position value in the direction of the optical axis 100 and with a surface vertex as a reference at a position of a height h; c is a curvature of a lens surface near the optical axis 100, and is a reciprocal of a radius of curvature (R) (c=1/R), R is a radius of curvature of a lens surface near the optical axis 100, h is a vertical distance between the lens surface and the optical axis 100, k is a conic constant, and Ai is an $i^{th}$ order aspheric coefficient.

In the optical lens assembly of the first embodiment, a focal length of the optical lens assembly is f, an f-number of the optical lens assembly is Fno, and a maximum field of view (field of view 2ω) in the optical lens assembly is FOV, and values are as follows: f=2.26 (mm); Fno=2.24; and FOV=124.9 (degrees).

In the optical lens assembly of the first embodiment, half of a maximum field of view of the optical lens assembly is HFOV, an f-number of the optical lens assembly is Fno, a distance from the object-side surface 111 of the first lens 110 to the image plane 190 along the optical axis 100 is TL, a maximum image height of the optical lens assembly is IMH, a focal length of the optical lens assembly is f, a focal length of the first lens 110 is f1, and the following conditions are satisfied: HFOV/(INM*Fno*TL)=1.36, and f/f1=−0.37.

In the optical lens assembly of the first embodiment, a curvature radius of the object-side surface 111 of the first lens 110 is R1, a curvature radius of the image-side surface 112 of the first lens 110 is R2, and the following condition is satisfied: R1/R2=−0.39.

In the optical lens assembly of the first embodiment, a central thickness of the third lens 130 along the optical axis 100 is CT3, a curvature radius of the object-side surface 131 of the third lens 130 is R5, a curvature radius of the image-side surface 132 of the third lens 130 is R6, and the following condition is satisfied: CT3*(R5/R6)=0.39.

In the optical lens assembly of the first embodiment, a focal length of the optical lens assembly is f, a focal length of the sixth lens 160 is f6, and the following condition is satisfied: f/f6=−0.91.

In the optical lens assembly of the first embodiment, a focal length of the first lens 110 is f1, a focal length of the third lens 130 is f3, a focal length of the sixth lens 160 is f6, and the following condition is satisfied: f3*f6/f1=−4.42.

In the optical lens assembly of the first embodiment, a focal length of the third lens 130 is f3, a focal length of the fourth lens 140 is f4, a focal length of the fifth lens 150 is f5, and the following condition is satisfied: f4/(f3*f5)=−3.07.

In the optical lens assembly of the first embodiment, a central thickness of the third lens 130 along the optical axis 100 is CT3, a central thickness of the fourth lens 140 along the optical axis 100 is CT4, a central thickness of the fifth lens 150 along the optical axis 100 is CT5, a central thickness of the sixth lens 160 along the optical axis 100 is CT6, and the following condition is satisfied: (CT4+CT5)/(CT3+CT6)=2.14.

In the optical lens assembly of the first embodiment, a central thickness of the first lens 110 along the optical axis 100 is CT1, a central thickness of the sixth lens 160 along the optical axis 100 is CT6, a distance from the image-side surface of the first lens 110 to the stop along the optical axis 100 is T1S, and the following condition is satisfied: (CT1+CT6)/T1S=0.92.

In the optical lens assembly of the first embodiment, a distance from the object-side surface 111 of the first lens 110 to the image plane 190 along the optical axis 100 is TL, a maximum image height of the optical lens assembly is INM, and the following condition is satisfied: TL/IMH=1.91.

In the optical lens assembly of the first embodiment, a distance from the object-side surface 111 of the first lens 110 to the image plane 190 along the optical axis 100 is TL, a distance from the image-side surface 162 of the sixth lens 160 to the image plane 190 along the optical axis 100 is BFL, a focal length of the optical lens assembly is f, and the following condition is satisfied: (TL-BFL)/f=2.18.

In the optical lens assembly of the first embodiment, a maximum image height of the optical lens assembly is IMH, a central thickness of the first lens 110 along the optical axis 100 is CT1, a central thickness of the third lens 130 along the optical axis 100 is CT3, and the following condition is satisfied: IMH/(CT1+CT3)=4.98.

In the optical lens assembly of the first embodiment, a central thickness of the second lens 120 along the optical axis 100 is CT2, a central thickness of the fifth lens 150 along the optical axis 100 is CT5, a focal length of the second lens 120 is f2, a focal length of the fifth lens 150 is f5, and the following condition is satisfied: (f2/CT2)−(f5/CT5)=2.72.

In the optical lens assembly of the first embodiment, an Abbe number of the third lens 130 is vd3, an Abbe number of the fourth lens 140 is vd4, and the following condition is satisfied: vd4−vd3=36.76.

In the optical lens assembly of the first embodiment, an Abbe number of the fifth lens 150 is vd5, an Abbe number of the sixth lens 160 is vd6, a focal length of the fifth lens 150 is f5, a focal length of the sixth lens 160 is f6, and the following condition is satisfied: |vd5/f5−vd6/f6|=37.65.

In the optical lens assembly of the first embodiment, a focal length of the first lens 110 is f1, a focal length of the second lens 120 is f2, and the following condition is satisfied: f1/f2=−1.98.

In the optical lens assembly of the first embodiment, a focal length of the third lens 130 is f3, a focal length of the fifth lens 150 is f5, and the following condition is satisfied: f3/f5=−5.78.

In the optical lens assembly of the first embodiment, a maximum image height of the optical lens assembly is IMH, and the following condition is satisfied: IMH=3.28 mm.

Refer to Table 1 and Table 2 below.

TABLE 1

First embodiment
f (focal length) = 2.26 mm, Fno (f-number) = 2.24, FOV (field of view 2ω) = 124.9 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −4.646 | (ASP) | 0.419 | Plastic | 1.54 | 56.00 | −6.08 |
| 2 | | 12.050 | (ASP) | 0.995 | | | | |
| 3 | Stop | Infinity | | −0.010 | | | | |
| 4 | Second lens | 3.554 | (ASP) | 0.646 | Plastic | 1.54 | 56.00 | 3.08 |
| 5 | | −2.981 | (ASP) | 0.307 | | | | |
| 6 | Third lens | 4.322 | (ASP) | 0.240 | Plastic | 1.67 | 19.24 | −10.84 |
| 7 | | 2.659 | (ASP) | 0.127 | | | | |
| 8 | Fourth lens | 8.334 | (ASP) | 0.652 | Plastic | 1.54 | 56.00 | 62.25 |
| 9 | | 10.735 | (ASP) | 0.119 | | | | |
| 10 | Fifth lens | −14.157 | (ASP) | 0.915 | Plastic | 1.54 | 56.00 | 1.87 |
| 11 | | −0.976 | (ASP) | 0.030 | | | | |
| 12 | Sixth lens | 1.497 | (ASP) | 0.493 | Plastic | 1.67 | 19.24 | −2.48 |
| 13 | | 0.686 | (ASP) | 0.600 | | | | |
| 14 | IR-cut filter | Infinity | | 0.210 | Glass | 1.52 | 64.20 | |
| 15 | | Infinity | | 0.518 | | | | |
| 16 | Image plane | Infinity | | — | | | | |

Reference wavelength 555 nm

TABLE 2

Aspheric coefficient

| | Surface | | | | | |
|---|---|---|---|---|---|---|
| | 1 | 2 | 4 | 5 | 6 | 7 |
| K: | −1.1756E+01 | −9.0000E+01 | −3.4899E+00 | 5.5533E+00 | −9.0000E+01 | −8.7474E+00 |
| A2: | 0.0000E+00 | 0.0000E+00 | 0.0000E+00 | 0.0000E+00 | 0.0000E+00 | 0.0000E+00 |
| A4: | 1.8866E−01 | 2.6041E−01 | −3.3420E−02 | −5.6623E−02 | −5.8729E−02 | −5.0725E−02 |
| A6: | −1.4925E−01 | −3.9260E−02 | 8.8953E−01 | 6.4483E−03 | −1.6159E−01 | −2.0372E−01 |
| A8: | 1.2405E−01 | −4.2807E−01 | −1.3362E+01 | −7.3193E−02 | 1.1219E+00 | 7.7950E−01 |
| A10: | −8.4485E−02 | 1.6704E+00 | 1.1319E+02 | 6.6521E−01 | 1.1219E+00 | −1.5612E+00 |
| A12: | 4.2860E−02 | −3.1915E+00 | −5.8936E+02 | −2.8278E+00 | −3.4202E+00 | 1.9309E+00 |
| A14: | −1.5160E−02 | 3.6556E+00 | 1.9001E+03 | 5.9518E+00 | 5.4773E+00 | −1.4849E+00 |
| A16: | 3.4343E−03 | −2.4911E+00 | −3.6890E+03 | −6.5526E+00 | −4.9697E+00 | 6.9027E−01 |
| A18: | −4.4376E−04 | 9.2420E−01 | 3.9383E+03 | 3.0610E+00 | 2.3904E+00 | −1.7711E−01 |
| A20: | 2.4887E−05 | −1.4284E−01 | −1.7716E+03 | −2.6590E−01 | −4.7767E−01 | 1.9074E−02 |

| | Surface | | | | | |
|---|---|---|---|---|---|---|
| | 8 | 9 | 10 | 11 | 12 | 13 |
| K: | −1.3851E−01 | −4.0762E+01 | −2.5584E+01 | −1.3951E+00 | −1.1405E+01 | −3.5934E+00 |
| A2: | 0.0000E+00 | 0.0000E+00 | 0.0000E+00 | 0.0000E+00 | 0.0000E+00 | 0.0000E+00 |
| A4: | 3.4111E−02 | 1.8107E−01 | 2.8148E−01 | 1.5824E−01 | −3.4009E−02 | −1.2178E−01 |
| A6: | −4.1733E−01 | −6.3456E−01 | −5.4557E−01 | −6.5566E−02 | −1.3374E−01 | 6.9458E−02 |
| A8: | 1.3045E+00 | 8.2353E−01 | 4.5565E−01 | −1.4795E−01 | 1.6579E−01 | −2.9771E−02 |
| A10: | −2.1377E+00 | −6.7628E−01 | −1.4423E−01 | 3.1183E−01 | −1.0912E−01 | 8.8184E−03 |
| A12: | 2.1125E+00 | 3.3244E−01 | −1.0787E−01 | −2.7569E−01 | 4.3164E−02 | −1.7630E−03 |
| A14: | −1.3003E+00 | −8.3128E−02 | 1.3228E−01 | 1.3558E−01 | −1.0644E−02 | 2.2684E−04 |
| A16: | 4.8443E−01 | 4.9273E−03 | −5.5963E−02 | −3.8194E−02 | 1.6128E−03 | −1.7270E−05 |
| A18: | −9.8894E−02 | 1.4966E−03 | 1.0868E−02 | 5.7549E−03 | −1.3593E−04 | 6.3201E−07 |
| A20: | 8.3530E−03 | −1.4636E−04 | −7.9898E−04 | −3.5952E−04 | 4.7508E−06 | −4.4681E−09 |

Table 1 shows detailed configuration data of the first embodiment in FIG. 1A. Units of the radius of curvature, the central thickness, the gap, and the focal length is mm. Surfaces 0 to 16 sequentially represent surfaces from an object side to an image side. Surface 3 is a gap between the stop STO and the object-side surface 121 of the second lens 120 along the optical axis 100, and the object-side surface 121 of the second lens 120 is closer to the object side than the stop STO, and therefore the surface is represented by a negative value. On the contrary, if the stop STO is closer to the object side than the object-side surface 121 of the second lens 120, the surface is represented by a positive value. Surfaces 1, 4, 6, 8, 10, 12 and 14 are respectively central thicknesses of the first lens 110, the second lens 120, the third lens 130, the fourth lens 140, the fifth lens 150, the sixth lens 160, and the IR-cut filter 180 along the optical axis 100. Surfaces 2, 5, 7, 9, 11, 13 and 15 are respectively a gap between the first lens 110 and the second lens 120 along the optical axis 100, a gap between the second lens 120 and the third lens 130 along the optical axis 100, a gap between the third lens 130 and the fourth lens 140 along the optical axis 100, a gap between the fourth lens 140 and the fifth lens 150 along the optical axis 100, a gap between the fifth lens 150 and the sixth lens 160 along the optical axis 100, a gap between the sixth lens 160 and the IR-cut filter 180 along the optical axis 100, and a gap between the IR-cut filter 180 and the image plane 190 along the optical axis 100.

Second Embodiment

Figure 2A:
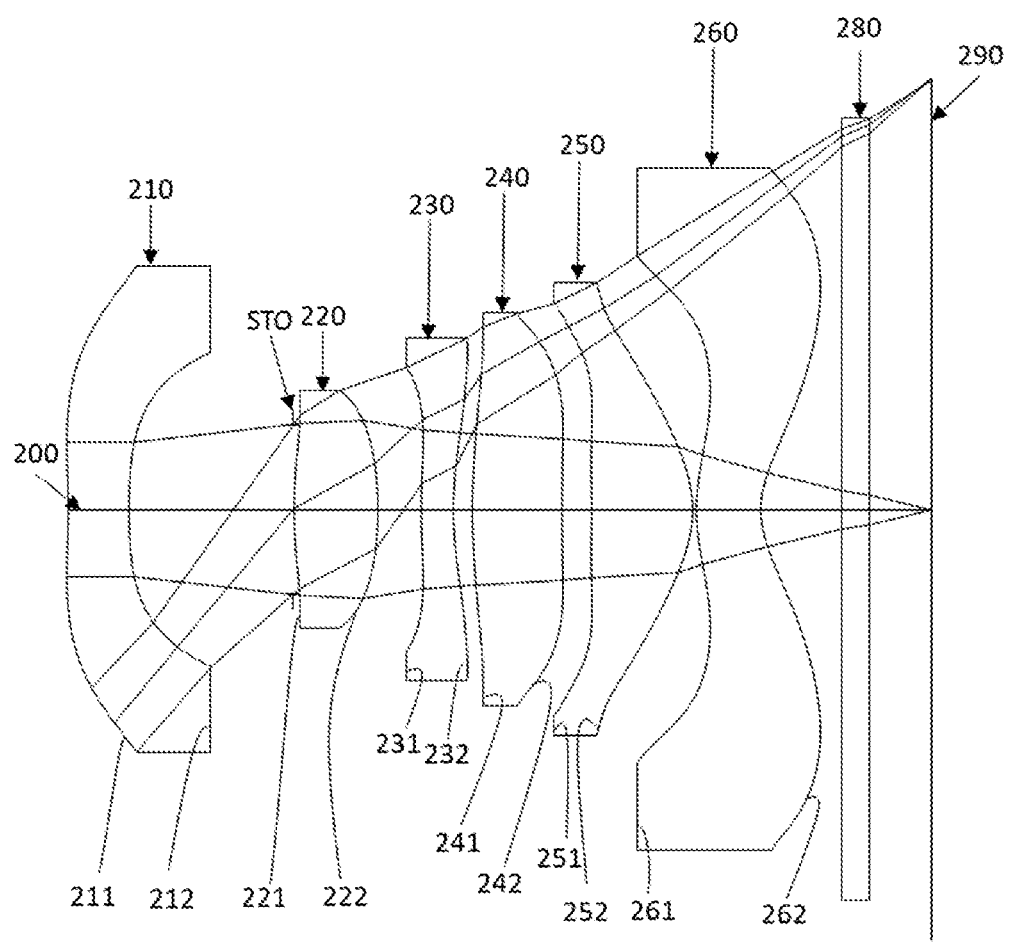
FIG. 2A is a schematic view of an optical lens assembly according to a second embodiment of the present disclosure.
Figure 2B:
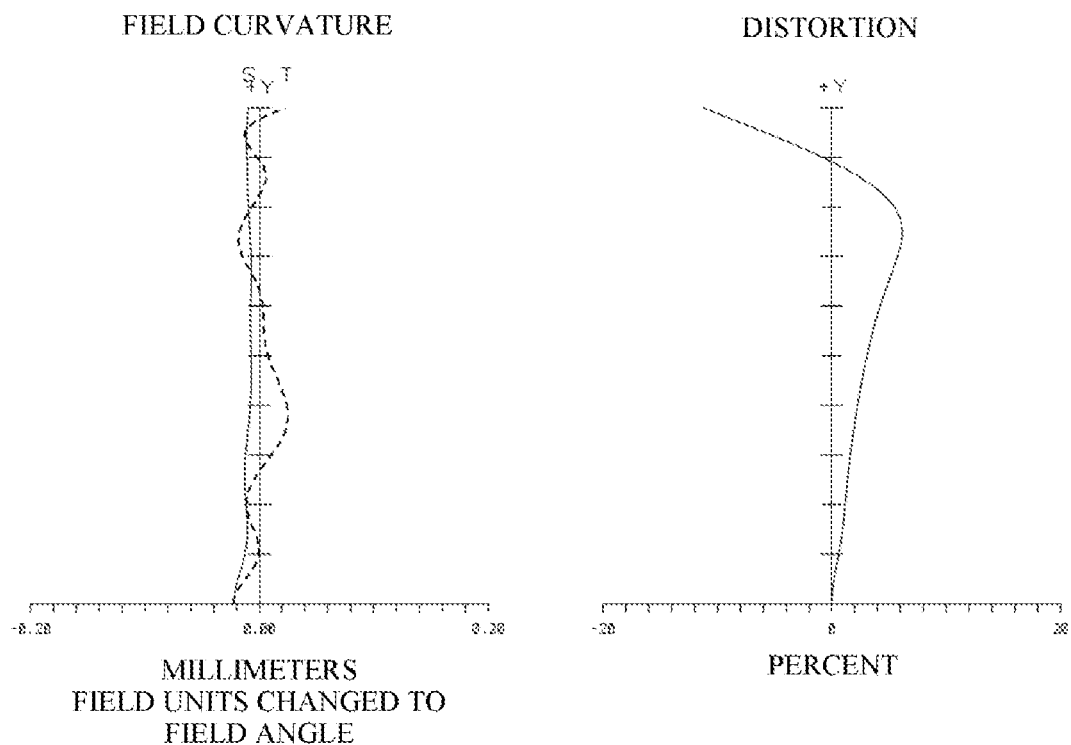
FIG. 2B sequentially shows a field curvature curve and a distortion curve of the optical lens assembly according to the second embodiment.

FIG. 2A is a schematic view of an optical lens assembly according to the second embodiment of the present disclosure. FIG. 2B sequentially shows a field curvature curve and a distortion curve of the optical lens assembly according to the second embodiment. It can be seen from FIG. 2A that the optical lens assembly includes, in order from an object-side to an image-side: a first lens 210, a stop, a second lens 220, a third lens 230, a fourth lens 240, a fifth lens 250, a sixth lens 260, an IR-cut (infrared-cut) filter 280, and an image plane 290. A total quantity of lenses with refractive power in the optical lens assembly is six, but not limited thereto.

The first lens 210 with negative refractive power is made of a plastic material and includes an object-side surface 211 and an image-side surface 212, wherein the object-side surface 211 of the first lens 210 is concave near an optical axis 200, the image-side surface 212 of the first lens 210 is concave near the optical axis 200, and the object-side surface 211 and image-side surface 212 both are aspheric.

The second lens 220 with positive refractive power is made of a plastic material and includes an object-side surface 221 and an image-side surface 222, wherein the object-side surface 221 of the second lens 220 is convex near the optical axis 200, the image-side surface 222 of the second lens 220 is convex near the optical axis 200, and the object-side surface 221 and image-side surface 222 both are aspheric.

The third lens 230 with negative refractive power is made of a plastic material and includes an object-side surface 231 and an image-side surface 232, wherein the object-side surface 231 of the third lens 230 is convex near the optical axis 200, the image-side surface 232 of the third lens 230 is concave near the optical axis 200, and the object-side surface 231 and image-side surface 232 both are aspheric.

The fourth lens 240 with positive refractive power is made of a plastic material and includes an object-side surface 241 and an image-side surface 242, wherein the object-side surface 241 of the fourth lens 240 is convex near the optical axis 200, the image-side surface 242 of the fourth lens 240 is concave near the optical axis 200, and the object-side surface 241 and image-side surface 242 both are aspheric.

The fifth lens 250 with positive refractive power is made of a plastic material and includes an object-side surface 251 and an image-side surface 252, wherein the object-side surface 251 of the fifth lens 250 is concave near the optical axis 200, the image-side surface 252 of the fifth lens 250 is convex near the optical axis 200, and the object-side surface 251 and image-side surface 252 both are aspheric.

The sixth lens 260 with positive refractive power is made of a plastic material and includes an object-side surface 261 and an image-side surface 262, wherein the object-side surface 261 of the sixth lens 260 is convex near the optical axis 200, the image-side surface 262 of the sixth lens 260 is concave near the optical axis 200, and the object-side surface 261 and image-side surface 262 both are aspheric.

The IR-cut filter 280 is made of glass and is disposed between the sixth lens and the image plane 290 without affecting a focal length of the optical lens assembly. It can be understood that the IR-cut filter 280 may also be formed on the surface of the above-mentioned lens, and the IR-cut filter 280 may also be made of other materials.

Refer to Table 3 and Table 4 below.

TABLE 3

Second embodiment
f (focal length) = 2.12 mm, Fno (f-number) = 2.08, FOV (field of view 2ω) = 120.0 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −6.126 | (ASP) | 0.448 | Plastic | 1.54 | 56.00 | −5.45 |
| 2 | | 5.944 | (ASP) | 1.219 | | | | |
| 3 | Stop | Infinity | | 0.005 | | | | |
| 4 | Second lens | 3.640 | (ASP) | 0.624 | Plastic | 1.54 | 56.00 | 3.01 |
| 5 | | −2.821 | (ASP) | 0.323 | | | | |
| 6 | Third lens | 4.774 | (ASP) | 0.240 | Plastic | 1.67 | 19.24 | −9.08 |
| 7 | | 2.634 | (ASP) | 0.140 | | | | |
| 8 | Fourth lens | 5.299 | (ASP) | 0.666 | Plastic | 1.54 | 56.00 | 12.44 |
| 9 | | 22.998 | (ASP) | 0.222 | | | | |
| 10 | Fifth lens | −8.670 | (ASP) | 0.745 | Plastic | 1.54 | 56.00 | 1.96 |
| 11 | | −0.981 | (ASP) | 0.030 | | | | |
| 12 | Sixth lens | 1.489 | (ASP) | 0.480 | Plastic | 1.67 | 19.24 | −2.43 |
| 13 | | 0.680 | (ASP) | 0.600 | | | | |
| 14 | IR-cut filter | Infinity | | 0.210 | Glass | 1.52 | 64.20 | |
| 15 | | Infinity | | 0.459 | | | | |
| 16 | Image plane | Infinity | | — | | | | |

Reference wavelength 555 nm

TABLE 4

Aspheric coefficient

| | Surface | | | | | |
|---|---|---|---|---|---|---|
| | 1 | 2 | 4 | 5 | 6 | 7 |
| K: | −2.3757E+01 | −2.7739E+01 | −1.2420E+01 | 6.9899E+00 | −9.9900E+01 | −9.8961E+00 |
| A2: | 0.0000E+00 | 0.0000E+00 | 0.0000E+00 | 0.0000E+00 | 0.0000E+00 | 0.0000E+00 |
| A4: | 1.8658E−01 | 2.4702E−01 | −1.6483E−02 | −3.3011E−02 | −1.0176E−01 | −1.2064E−01 |
| A6: | −1.4213E−01 | 1.6144E−01 | 2.1586E−01 | −5.2761E−01 | 4.7091E−02 | 1.9287E−01 |
| A8: | 1.0517E−01 | −1.2459E+00 | −3.2374E+00 | 4.4148E+00 | 8.0310E−01 | −2.7785E−01 |
| A10: | −5.8313E−02 | 3.5494E+00 | 2.1968E+01 | −2.2332E+01 | 8.0310E−01 | 5.0933E−02 |
| A12: | 2.2672E−02 | −5.8276E+00 | −9.4922E+01 | 6.9609E+01 | −4.3357E−01 | 4.4356E−01 |
| A14: | −5.7645E−03 | 5.9610E+00 | 2.5685E+02 | −1.3506E+02 | −2.7651E−01 | −6.5840E−01 |
| A16: | 8.5958E−04 | −3.7179E+00 | −4.2081E+02 | 1.5802E+02 | 4.0856E−01 | 4.2917E−01 |
| A18: | −6.2891E−05 | 1.2952E+00 | 3.7634E+02 | −1.0191E+02 | −1.2872E−01 | −1.3694E−01 |
| A20: | 1.3605E−06 | −1.9375E−01 | −1.3963E+02 | 2.7712E+01 | −2.5261E−03 | 1.7216E−02 |

| | Surface | | | | | |
|---|---|---|---|---|---|---|
| | 8 | 9 | 10 | 11 | 12 | 13 |
| K: | −3.2990E+01 | −9.9900E+01 | −8.2057E+01 | −1.5294E+00 | −1.3623E+01 | −3.7867E+00 |
| A2: | 0.0000E+00 | 0.0000E+00 | 0.0000E+00 | 0.0000E+00 | 0.0000E+00 | 0.0000E+00 |
| A4: | −1.4251E−02 | 1.4729E−01 | 3.0961E−01 | 2.0221E−01 | −3.1331E−02 | −1.4002E−01 |
| A6: | −2.2343E−01 | −6.1658E−01 | −6.0854E−01 | −8.3359E−02 | −2.2582E−01 | 9.0696E−02 |
| A8: | 9.3805E−01 | 8.8120E−01 | 5.8916E−01 | −2.5452E−01 | 3.3771E−01 | −4.0739E−02 |
| A10: | −1.7602E+00 | −8.4264E−01 | −3.6189E−01 | 5.5361E−01 | −2.5520E−01 | 1.1938E−02 |
| A12: | 1.9083E+00 | 5.5710E−01 | 1.1173E−01 | −5.2235E−01 | 1.1531E−01 | −2.2247E−03 |
| A14: | −1.2712E+00 | −2.4223E−01 | 4.2815E−04 | 2.7142E−01 | −3.2643E−02 | 2.4105E−04 |
| A16: | 5.0944E−01 | 6.2422E−02 | −1.0541E−02 | −7.9424E−02 | 5.6533E−03 | −1.1253E−05 |
| A18: | −1.1153E−01 | −7.9118E−03 | 2.8301E−03 | 1.2228E−02 | −5.3877E−04 | −2.4539E−07 |
| A20: | 1.0127E−02 | 3.0747E−04 | −2.6733E−04 | −7.6906E−04 | 2.1133E−05 | 3.4056E−08 |

In the second embodiment, an aspheric curve equation is expressed as the form in the first embodiment. In addition, definitions of parameters in the table below are all the same as those of parameters in the first embodiment, and are not repeated herein.

Referring to Table 3 and Table 4, the following data may be calculated:

| Second embodiment | | | |
|---|---|---|---|
| f/f1 | −0.39 | TL/IMH | 1.95 |
| HFOV/(IMH*Fno*TL) | 1.37 | (TL-BFL)/f | 2.43 |
| R1/R2 | −1.03 | IMH/(CT1 + CT3) | 4.78 |
| CT3*(R5/R6) | 0.43 | (f2/CT2)-(f5/CT5) | 2.20 |
| f/f6 | −0.87 | vd4-vd3 | 36.76 |
| f3*f6/f1 | −4.04 | \|vd5/f5-vd6/f6\| | 36.53 |
| f4/(f3*f5) | −0.70 | f1/f2 | −1.81 |
| (CT4 + CT5)/(CT3 + CT6) | 1.96 | f3/f5 | −4.64 |
| (CT1 + CT6)/T1S | 0.76 | IMH [mm] | 3.28 |

Third Embodiment

Figure 3A:
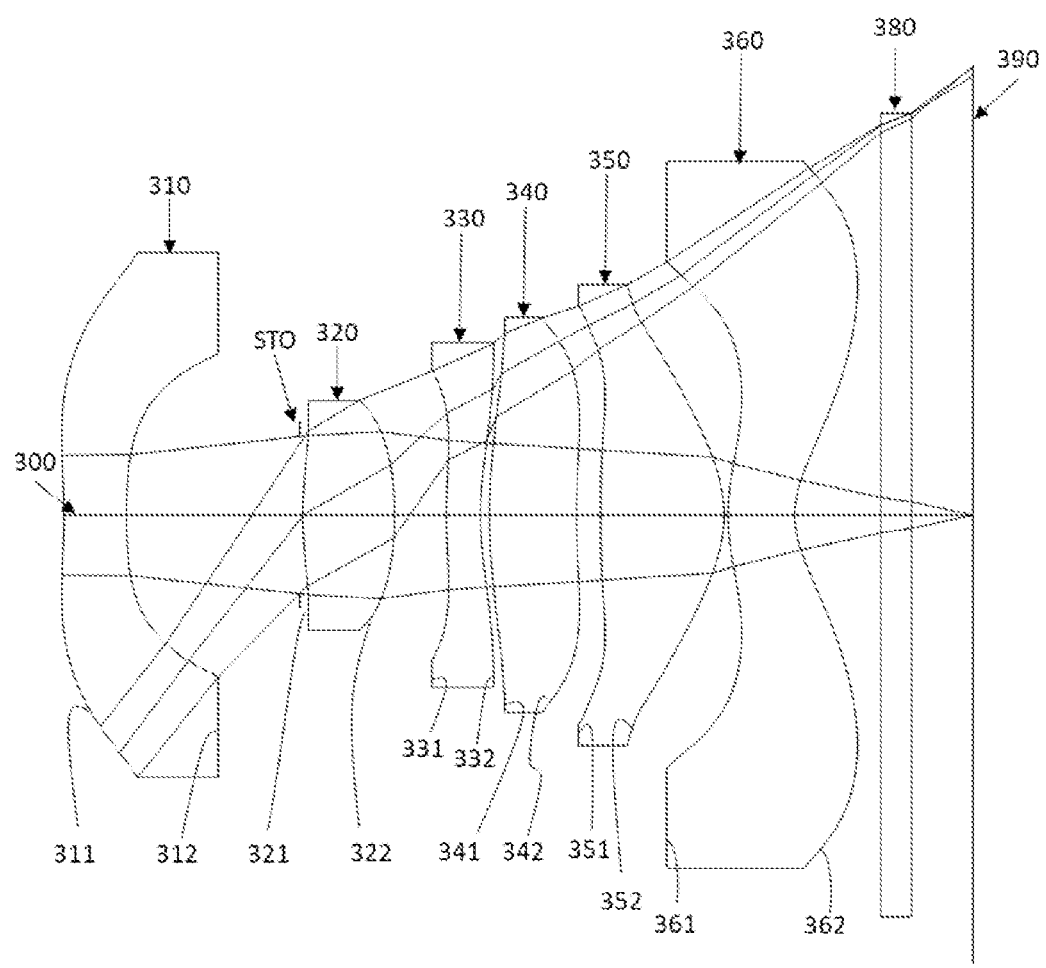
FIG. 3A is a schematic view of an optical lens assembly according to a third embodiment of the present disclosure.
Figure 3B:
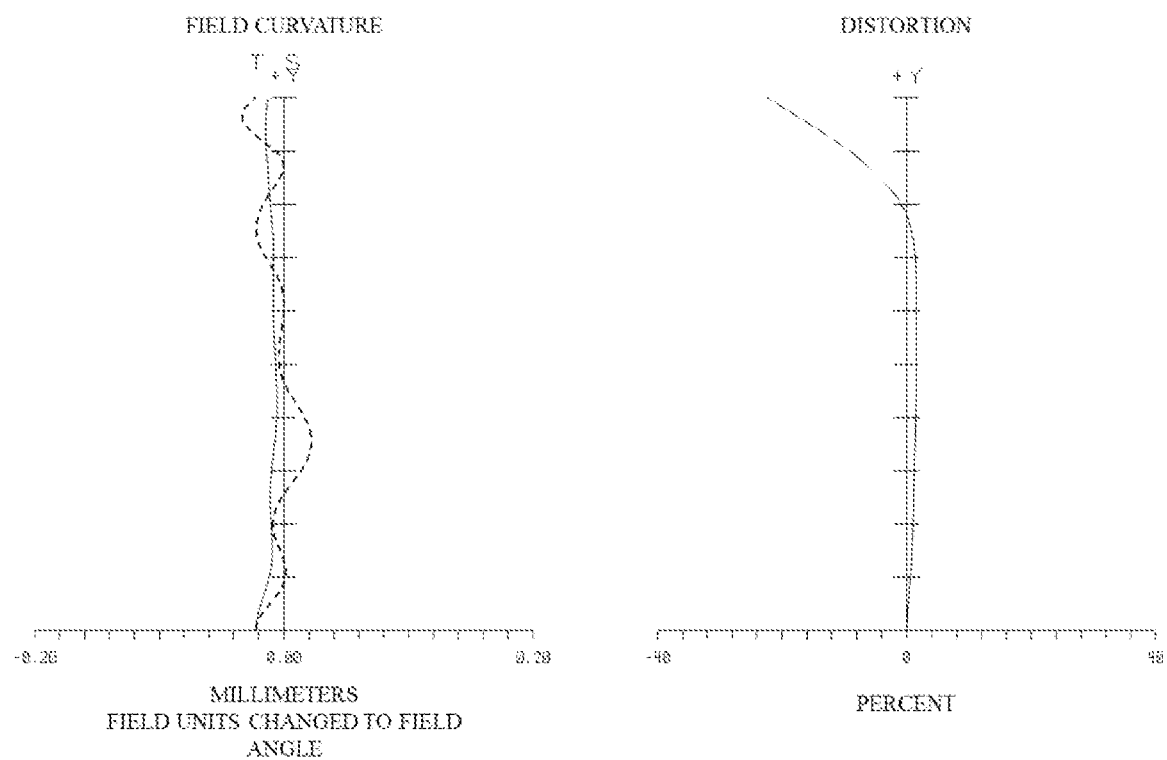
FIG. 3B sequentially shows a field curvature curve and a distortion curve of the optical lens assembly of the third embodiment.

FIG. 3A is a schematic view of an optical lens assembly according to the third embodiment of the present disclosure. FIG. 3B sequentially shows a field curvature curve and a distortion curve of the optical lens assembly according to the third embodiment. It can be seen from FIG. 3A that the optical lens assembly includes, in order from an object-side to an image-side: a first lens 310, a stop, a second lens 320, a third lens 330, a fourth lens 340, a fifth lens 350, a sixth lens 360, an IR-cut (infrared-cut) filter 380, and an image plane 390. A total quantity of lenses with refractive power in the optical lens assembly is six, but not limited thereto.

The first lens 310 with negative refractive power is made of a plastic material and includes an object-side surface 311 and an image-side surface 312, wherein the object-side surface 311 of the first lens 310 is concave near an optical axis 300, the image-side surface 312 of the first lens 310 is concave near the optical axis 300, and the object-side surface 311 and image-side surface 312 both are aspheric.

The second lens 320 with positive refractive power is made of a plastic material and includes an object-side surface 321 and an image-side surface 322, wherein the object-side surface 321 of the second lens 320 is convex near the optical axis 300, the image-side surface 322 of the second lens 320 is convex near the optical axis 300, and the object-side surface 321 and image-side surface 322 both are aspheric.

The third lens 330 with negative refractive power is made of a plastic material and includes an object-side surface 331 and an image-side surface 332, wherein the object-side surface 331 of the third lens 330 is convex near the optical axis 300, the image-side surface 332 of the third lens 330 is concave near the optical axis 300, and the object-side surface 331 and image-side surface 332 both are aspheric.

The fourth lens 340 with positive refractive power is made of a plastic material and includes an object-side surface 341 and an image-side surface 342, wherein the object-side surface 341 of the fourth lens 340 is convex near the optical axis 300, the image-side surface 342 of the fourth lens 340 is concave near the optical axis 300, and the object-side surface 341 and image-side surface 342 both are aspheric.

The fifth lens 350 with positive refractive power is made of a plastic material and includes an object-side surface 351 and an image-side surface 352, wherein the object-side surface 351 of the fifth lens 350 is concave near the optical axis 300, the image-side surface 352 of the fifth lens 350 is convex near the optical axis 300, and the object-side surface 351 and image-side surface 352 both are aspheric.

The sixth lens 360 with positive refractive power is made of a plastic material and includes an object-side surface 361 and an image-side surface 362, wherein the object-side surface 361 of the sixth lens 360 is convex near the optical axis 300, the image-side surface 362 of the sixth lens 360 is concave near the optical axis 300, and the object-side surface 361 and image-side surface 362 both are aspheric.

The IR-cut filter 380 is made of glass and is disposed between the sixth lens and the image plane 390 without affecting a focal length of the optical lens assembly. It can be understood that the IR-cut filter 380 may also be formed on the surface of the above-mentioned lens, and the IR-cut filter 380 may also be made of other materials.

Refer to Table 5 and Table 6 below.

TABLE 5

Third embodiment
f (focal length) = 1.96 mm, Fno (f-number) = 2.24, FOV (field of view 2ω) = 130.0 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −4.289 | (ASP) | 0.442 | Plastic | 1.54 | 56.00 | −4.56 |
| 2 | | 6.159 | (ASP) | 1.205 | | | | |
| 3 | Stop | Infinity | | 0.025 | | | | |
| 4 | Second lens | 3.859 | (ASP) | 0.633 | Plastic | 1.54 | 56.00 | 2.97 |
| 5 | | −2.638 | (ASP) | 0.367 | | | | |
| 6 | Third lens | 5.171 | (ASP) | 0.236 | Plastic | 1.68 | 18.15 | −8.95 |
| 7 | | 2.757 | (ASP) | 0.061 | | | | |
| 8 | Fourth lens | 3.879 | (ASP) | 0.610 | Plastic | 1.54 | 56.00 | 11.75 |
| 9 | | 9.255 | (ASP) | 0.168 | | | | |
| 10 | Fifth lens | −80.207 | (ASP) | 0.855 | Plastic | 1.54 | 56.00 | 1.87 |
| 11 | | −1.010 | (ASP) | 0.030 | | | | |
| 12 | Sixth lens | 1.501 | (ASP) | 0.465 | Plastic | 1.67 | 19.24 | −2.33 |
| 13 | | 0.674 | (ASP) | 0.600 | | | | |
| 14 | IR-cut filter | Infinity | | 0.210 | Glass | 1.52 | 64.20 | |
| 15 | | Infinity | | 0.433 | | | | |
| 16 | Image plane | Infinity | | — | | | | |

Reference wavelength 555 nm

TABLE 6

Aspheric coefficient

| Surface | | | | | |
|---|---|---|---|---|---|
| 1 | 2 | 4 | 5 | 6 | 7 |
| K: −2.8298E+01 | −2.3039E−01 | −2.7951E+01 | 7.2315E+00 | −9.9343E+01 | −1.1270E+01 |
| A2: 0.0000E+00 | 0.0000E+00 | 0.0000E+00 | 0.0000E+00 | 0.0000E+00 | 0.0000E+00 |
| A4: 2.0882E−01 | 2.8423E−01 | −2.0900E−02 | −5.7775E−02 | −9.3943E−02 | −7.9689E−02 |
| A6: −1.8011E−01 | 1.6722E−01 | 2.8801E−01 | −4.9364E−01 | 4.4848E−02 | −1.0858E−01 |
| A8: 1.3892E−01 | −1.4004E+00 | −4.3915E+00 | 4.3051E+00 | 3.4001E+00 | 6.6348E−01 |
| A10: −7.7686E−02 | 3.8475E+00 | 2.5949E+01 | −2.2974E+01 | 3.4001E+00 | −1.5550E+00 |
| A12: 2.9899E−02 | −5.9304E+00 | −8.7910E+01 | 7.6251E+01 | −7.0175E+00 | 2.0283E+00 |
| A14: −7.5137E−03 | 5.6190E+00 | 1.4288E+02 | −1.5949E+02 | 9.245 8E+00 | −1.5348E+00 |
| A16: 1.1419E−03 | −3.2125E+00 | −2.5713E+00 | 2.0338E+02 | −7.5964E+00 | 6.5186E−01 |
| A18: −9.3044E−05 | 1.0221E+00 | −3.2896E+02 | −1.4426E+02 | 3.5113E+00 | −1.3587E−01 |
| A20: 3.0357E−06 | −1.4128E−01 | 3.2843E+02 | 4.3545E+01 | −6.9209E−01 | 9.0358E−03 |

| Surface | | | | | |
|---|---|---|---|---|---|
| 8 | 9 | 10 | 11 | 12 | 13 |
| K: −2.8415E+01 | −6.6826E+01 | 9.9900E+01 | −1.5570E+00 | −1.4835E+01 | −3.8498E+00 |
| A2: 0.0000E+00 | 0.0000E+00 | 0.0000E+00 | 0.0000E+00 | 0.0000E+00 | 0.0000E+00 |
| A4: −1.6688E−03 | 1.8696E−01 | 3.3471E−01 | 1.9268E−01 | −4.1850E−02 | −1.2242E−01 |
| A6: −4.6804E−01 | −7.9984E−01 | −7.3067E−01 | −2.5592E−01 | −1.5989E−01 | 5.4879E−02 |
| A8: 1.9917E+00 | 1.1922E+00 | 7.8808E−01 | −3.8593E−01 | 1.4980E−01 | −6.5692E−03 |
| A10: −3.9594E+00 | −1.0384E+00 | −5.6617E−01 | 6.8496E−01 | −1.7370E−03 | −6.6878E−03 |
| A12: 4.5749E+00 | 5.1710E−01 | 3.1061E−01 | −5.7066E−01 | −7.4910E−02 | 3.9924E−03 |
| A14: −3.2485E+00 | −1.0519E−01 | −1.5859E−01 | 2.5989E−01 | 5.1560E−02 | −1.0559E−03 |
| A16: 1.3906E+00 | −2.6821E−02 | 6.7866E−02 | −6.4348E−02 | −1.6233E−02 | 1.5415E−04 |
| A18: −3.2693E−01 | 1.9078E−02 | −1.7318E−02 | 7.7781E−03 | 2.5493E−03 | −1.2066E−05 |
| A20: 3.2148E−02 | −2.9583E−03 | 1.7938E−03 | −3.2263E−04 | −1.6115E−04 | 3.9725E−07 |

In the third embodiment, an aspheric curve equation is expressed as the form in the first embodiment. In addition, definitions of parameters in the table below are all the same as those of parameters in the first embodiment, and are not repeated herein.

Referring to Table 5 and Table 6, the following data may be calculated:

| Third embodiment | | | |
|---|---|---|---|
| f/f1 | −0.43 | TL/IMH | 1.93 |
| HFOV/(IMH*Fno*TL) | 1.39 | (TL-BFL)/f | 2.60 |
| R1/R2 | −0.70 | IMH/(CT1 + CT3) | 4.84 |
| CT3*(R5/R6) | 0.44 | (f2/CT2)-(f5/CT5) | 2.51 |
| f/f6 | −0.84 | vd4-vd3 | 37.85 |
| f3*f6/f1 | −4.58 | \|vd5/f5-vd6/f6\| | 38.25 |
| f4/(f3*f5) | −0.70 | f1/f2 | −1.53 |
| (CT4 + CT5)/(CT3 + CT6) | 2.09 | f3/f5 | −4.79 |
| (CT1 + CT6)/T1S | 0.75 | IMH [mm] | 3.28 |

Fourth Embodiment

Figure 4A:
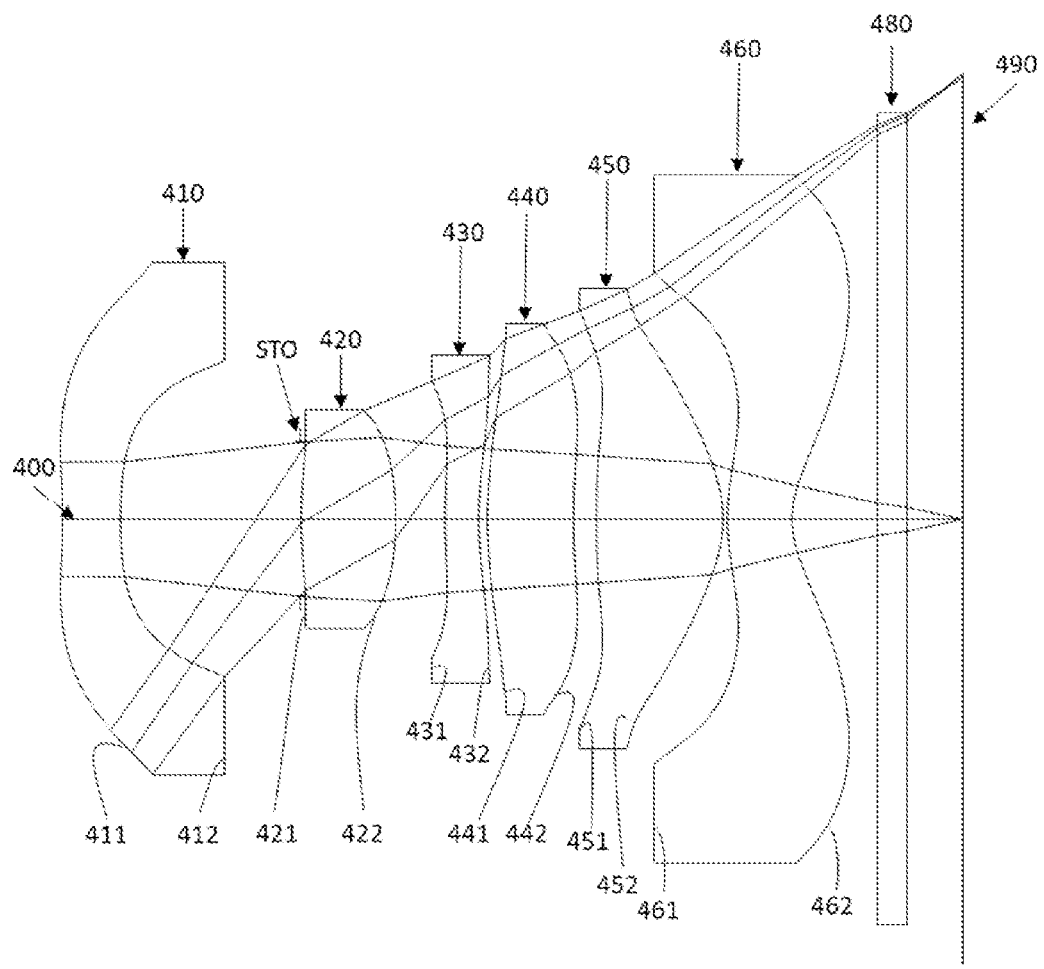
FIG. 4A is a schematic view of an optical lens assembly according to a fourth embodiment of the present disclosure.
Figure 4B:
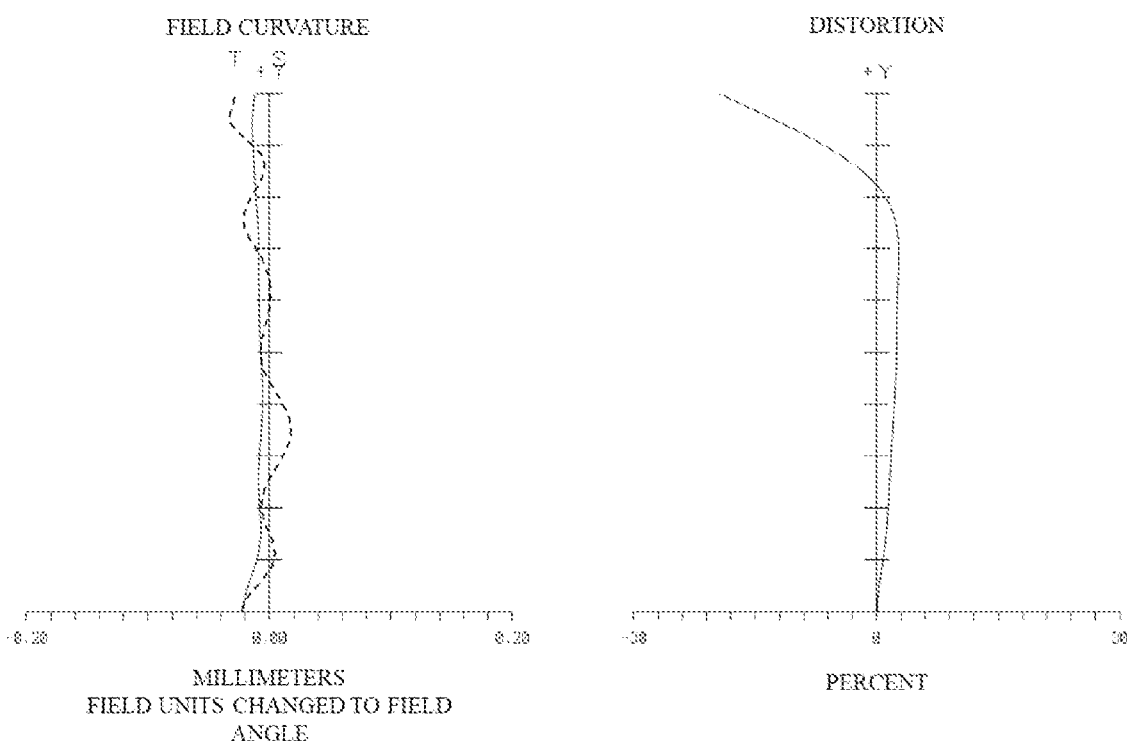
FIG. 4B sequentially shows a field curvature curve and a distortion curve of the optical lens assembly of the fourth embodiment.

FIG. 4A is a schematic view of an optical lens assembly according to the fourth embodiment of the present disclosure. FIG. 4B sequentially shows a field curvature curve and a distortion curve of the optical lens assembly according to the fourth embodiment. It can be seen from FIG. 4A that the optical lens assembly includes, in order from an object-side to an image-side: a first lens 410, a stop, a second lens 420, a third lens 430, a fourth lens 440, a fifth lens 450, a sixth lens 460, an IR-cut (infrared-cut) filter 480, and an image plane 490. A total quantity of lenses with refractive power in the optical lens assembly is six, but not limited thereto.

The first lens 410 with negative refractive power is made of a plastic material and includes an object-side surface 411 and an image-side surface 412, wherein the object-side surface 411 of the first lens 410 is concave near an optical axis 400, the image-side surface 412 of the first lens 410 is concave near the optical axis 400, and the object-side surface 411 and image-side surface 412 both are aspheric.

The second lens 420 with positive refractive power is made of a plastic material and includes an object-side surface 421 and an image-side surface 422, wherein the object-side surface 421 of the second lens 420 is convex near the optical axis 400, the image-side surface 422 of the second lens 420 is convex near the optical axis 400, and the object-side surface 421 and image-side surface 422 both are aspheric.

The third lens 430 with negative refractive power is made of a plastic material and includes an object-side surface 431 and an image-side surface 432, wherein the object-side surface 431 of the third lens 430 is convex near the optical axis 400, the image-side surface 432 of the third lens 430 is concave near the optical axis 400, and the object-side surface 431 and image-side surface 432 both are aspheric.

The fourth lens 440 with positive refractive power is made of a plastic material and includes an object-side surface 441 and an image-side surface 442, wherein the object-side surface 441 of the fourth lens 440 is convex near the optical axis 400, the image-side surface 442 of the fourth lens 440 is concave near the optical axis 400, and the object-side surface 441 and image-side surface 442 both are aspheric.

The fifth lens 450 with positive refractive power is made of a plastic material and includes an object-side surface 451 and an image-side surface 452, wherein the object-side surface 451 of the fifth lens 450 is convex near the optical axis 400, the image-side surface 452 of the fifth lens 450 is convex near the optical axis 400, and the object-side surface 451 and image-side surface 452 both are aspheric.

The sixth lens 460 with positive refractive power is made of a plastic material and includes an object-side surface 461 and an image-side surface 462, wherein the object-side surface 461 of the sixth lens 460 is convex near the optical axis 400, the image-side surface 462 of the sixth lens 460 is concave near the optical axis 400, and the object-side surface 461 and image-side surface 462 both are aspheric.

The JR-cut filter 480 is made of glass and is disposed between the sixth lens and the image plane 490 without affecting a focal length of the optical lens assembly. It can be understood that the JR-cut filter 480 may also be formed on the surface of the above-mentioned lens, and the IR-cut filter 480 may also be made of other materials.

Refer to Table 7 and Table 8 below.

TABLE 7 fourth embodiment
f (focal length) = 1.89 mm, Fno (f-number) = 2.24, FOV (field of view 2ω) = 130.0 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −4.133 | (ASP) | 0.405 | Plastic | 1.54 | 56.00 | −4.24 |
| 2 | | 5.453 | (ASP) | 1.272 | | | | |
| 3 | Stop | Infinity | | 0.009 | | | | |
| 4 | Second lens | 3.915 | (ASP) | 0.663 | Plastic | 1.54 | 56.00 | 2.94 |
| 5 | | −2.567 | (ASP) | 0.352 | | | | |
| 6 | Third lens | 5.093 | (ASP) | 0.236 | Plastic | 1.68 | 18.15 | −9.57 |
| 7 | | 2.817 | (ASP) | 0.067 | | | | |
| 8 | Fourth lens | 3.565 | (ASP) | 0.605 | Plastic | 1.54 | 56.00 | 11.80 |
| 9 | | 7.502 | (ASP) | 0.163 | | | | |
| 10 | Fifth lens | 29.638 | (ASP) | 0.893 | Plastic | 1.54 | 56.00 | 1.78 |
| 11 | | −0.994 | (ASP) | 0.030 | | | | |
| 12 | Sixth lens | 1.645 | (ASP) | 0.460 | Plastic | 1.67 | 19.24 | −2.15 |
| 13 | | 0.685 | (ASP) | 0.600 | | | | |
| 14 | IR-cut fdter | Infinity | | 0.210 | Glass | 1.52 | 64.20 | |
| 15 | | Infinity | | 0.397 | | | | |
| 16 | Image plane | Infinity | | — | | | | |

Reference wavelength 555 nm

TABLE 8

Aspheric coefficient

| | Surface | | | | | |
|---|---|---|---|---|---|---|
| | 1 | 2 | 4 | 5 | 6 | 7 |
| K: | −8.2178E+01 | 1.8333E+01 | −3.2379E+01 | 7.0403E+00 | −9.9900E+01 | −1.3692E+01 |
| A2: | 0.0000E+00 | 0.0000E+00 | 0.0000E+00 | 0.0000E+00 | 0.0000E+00 | 0.0000E+00 |
| A4: | 1.8564E−01 | 3.5767E−01 | −3.7392E−02 | −8.7575E−02 | −9.2552E−02 | −8.3310E−02 |
| A6: | −1.1707E−01 | −1.2746E−01 | 9.4669E−01 | −2.9616E−01 | 1.7849E−02 | −1.6175E−02 |
| A8: | 5.3274E−02 | −2.5667E−01 | −1.7161E+01 | 2.5369E+00 | 5.0516E+00 | 1.7150E−01 |
| A10: | −1.8034E−03 | 7.7592E−01 | 1.6147E+02 | −1.3389E+01 | 5.0516E+00 | −3.7620E−01 |
| A12: | −1.3939E−02 | −6.1778E−01 | −9.5719E+02 | 4.4507E+01 | −1.1220E+01 | 3.6689E−01 |
| A14: | 8.8471E−03 | −9.8044E−02 | 3.5823E+03 | −9.4100E+01 | 1.5613E+01 | −4.6404E−02 |
| A16: | −2.6343E−03 | 4.5182E−01 | −8.2074E+03 | 1.2199E+02 | −1.3404E+01 | −1.8839E−01 |
| A18: | 3.9324E−04 | −2.2748E−01 | 1.0485E+04 | −8.8290E+01 | 6.4658E+00 | 1.3872E−01 |
| A20: | −2.3555E−05 | 2.6373E−02 | −5.7161E+03 | 2.7333E+01 | −1.3352E+00 | −3.0641E−02 |

| | Surface | | | | | |
|---|---|---|---|---|---|---|
| | 8 | 9 | 10 | 11 | 12 | 13 |
| K: | −2.8939E+01 | −6.9640E+01 | −9.9900E+01 | −1.5992E+00 | −1.9864E+01 | −4.1649E+00 |
| A2: | 0.0000E+00 | 0.0000E+00 | 0.0000E+00 | 0.0000E+00 | 0.0000E+00 | 0.0000E+00 |
| A4: | −2.1769E−02 | 1.9885E−02 | 3.2674E−01 | 2.1519E−01 | −6.1631E−02 | −1.0674E−01 |
| A6: | −3.4393E−01 | −8.3185E−01 | −6.7218E−01 | −1.8523E−02 | −5.8211E−02 | 2.4563E−02 |
| A8: | 1.6516E+00 | 1.1646E+00 | 5.9959E−01 | −4.2603E−01 | −1.1398E−01 | 1.8968E−02 |
| A10: | −3.4312E+00 | −8.8909E−01 | −3.1769E−01 | 6.6979E−01 | 3.3004E−01 | −1.8962E−02 |
| A12: | 4.0836E+00 | 3.3394E−01 | 1.2627E−01 | −5.0128E−01 | −3.1349E−01 | 7.6611E−03 |
| A14: | −2.9757E+00 | 3.6418E−03 | −6.5229E−02 | 2.0555E−01 | 1.5541E−01 | −1.7532E−03 |
| A16: | 1.3075E+00 | −5.9338E−02 | 3.3645E−02 | −4.4764E−02 | −4.3395E−02 | 2.3642E−04 |
| A18: | −3.1648E−01 | 2.2810E−02 | −9.3937E−03 | 4.3357E−03 | 6.4799E−03 | −1.7580E−05 |
| A20: | 3.2278E−02 | −2.8764E−03 | 9.8006E−04 | −8.4592E−05 | −4.0259E−04 | 5.5825E−07 |

In the fourth embodiment, an aspheric curve equation is expressed as the form in the first embodiment. In addition, definitions of parameters in the table below are all the same as those of parameters in the first embodiment, and are not repeated herein.

Referring to Table 7 and Table 8, the following data may be calculated:

| Fourth embodiment | | | |
|---|---|---|---|
| f/f1 | −0.45 | TL/IMH | 1.94 |
| HFOV/(IMH*Fno*TL) | 1.39 | (TL-BFL)/f | 2.73 |
| R1/R2 | −0.76 | IMH/(CT1 + CT3) | 5.13 |
| CT3*(R5/R6) | 0.43 | (f2/CT2)-(f5/CT5) | 2.45 |
| f/f6 | −0.88 | vd4-vd3 | 37.85 |
| f3*f6/f1 | −4.85 | \|vd5/f5-vd6/f6\| | 40.45 |
| f4/(f3*f5) | −0.69 | f1/f2 | −1.44 |
| (CT4 + CT5)/(CT3 + CT6) | 2.15 | f3/f5 | −5.38 |
| (CT1 + CT6)/T1S | 0.68 | IMH [mm] | 3.28 |

Fifth Embodiment

Figure 5A:
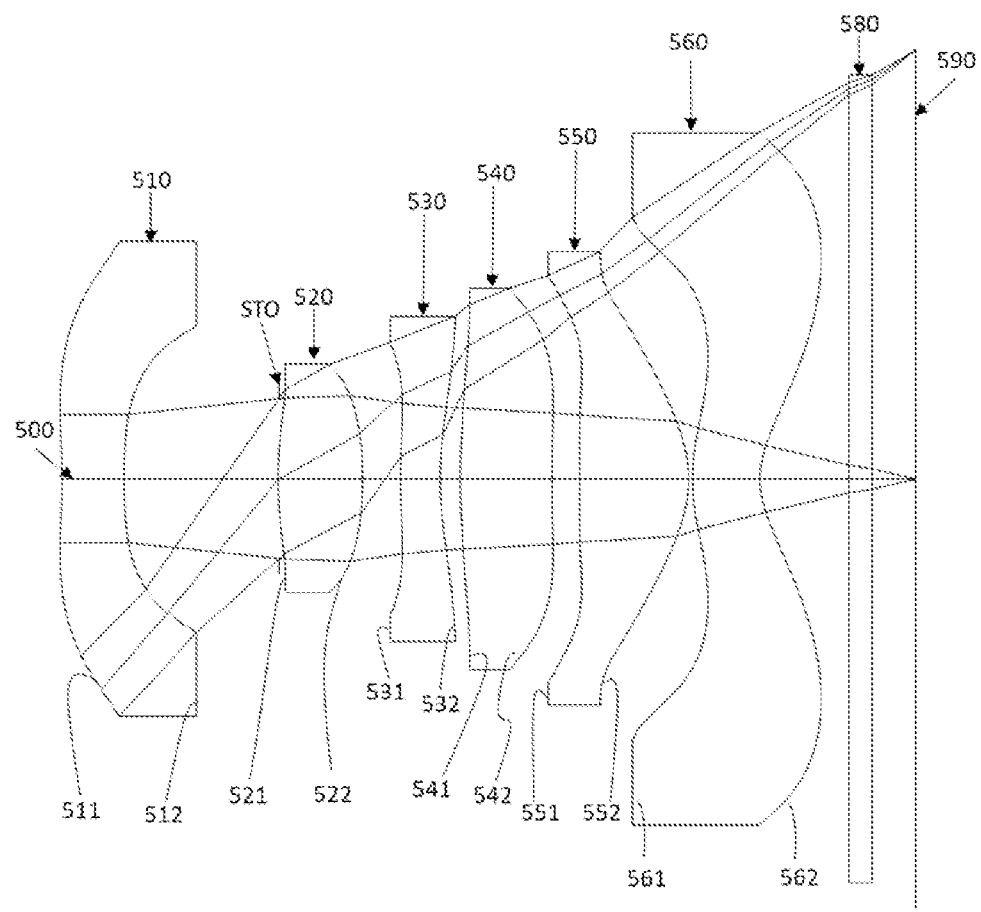
FIG. 5A is a schematic view of an optical lens assembly according to a fifth embodiment of the present disclosure.
Figure 5B:
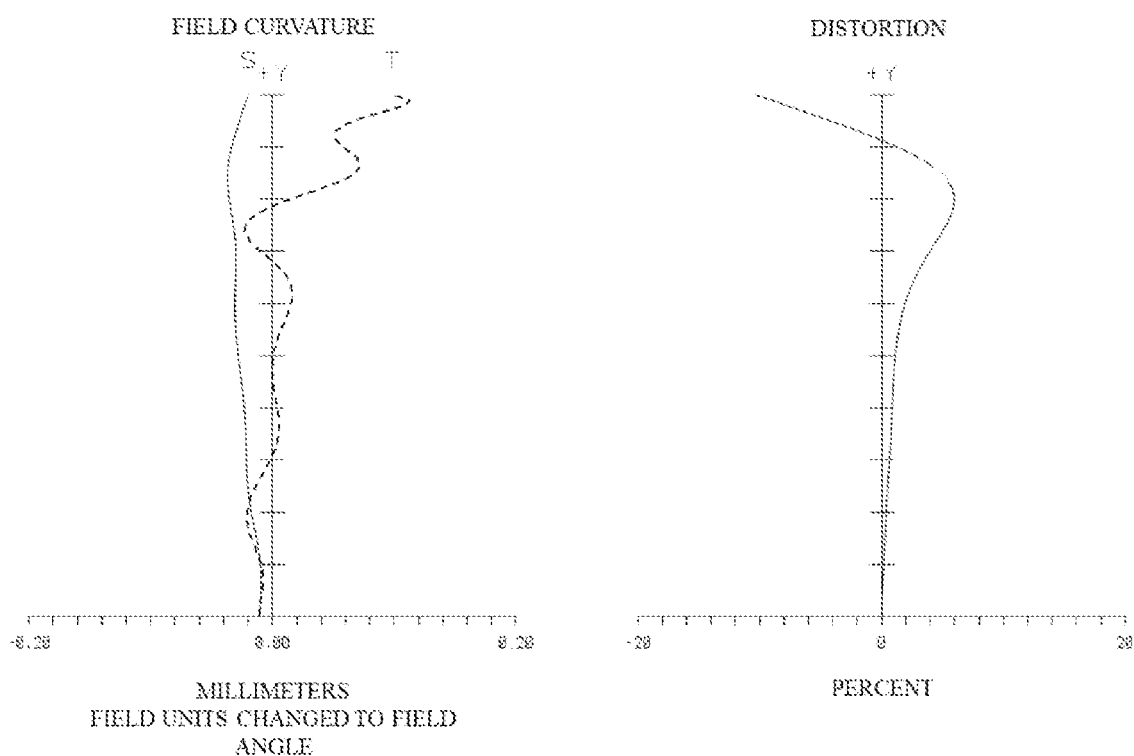
FIG. 5B sequentially shows a field curvature curve and a distortion curve of the optical lens assembly of the fifth embodiment.

FIG. 5A is a schematic view of an optical lens assembly according to the fifth embodiment of the present disclosure. FIG. 5B sequentially shows a field curvature curve and a distortion curve of the optical lens assembly according to the fifth embodiment. It can be seen from FIG. 5A that the optical lens assembly includes, in order from an object-side to an image-side: a first lens 510, a stop, a second lens 520, a third lens 530, a fourth lens 540, a fifth lens 550, a sixth lens 560, an IR-cut (infrared-cut) filter 580, and an image plane 590. A total quantity of lenses with refractive power in the optical lens assembly is six, but not limited thereto.

The first lens 510 with negative refractive power is made of a plastic material and includes an object-side surface 511 and an image-side surface 512, wherein the object-side surface 511 of the first lens 510 is concave near an optical axis 500, the image-side surface 512 of the first lens 510 is concave near the optical axis 500, and the object-side surface 511 and image-side surface 512 both are aspheric.

The second lens 520 with positive refractive power is made of a plastic material and includes an object-side surface 521 and an image-side surface 522, wherein the object-side surface 521 of the second lens 520 is convex near the optical axis 500, the image-side surface 522 of the second lens 520 is convex near the optical axis 500, and the object-side surface 521 and image-side surface 522 both are aspheric.

The third lens 530 with negative refractive power is made of a plastic material and includes an object-side surface 531 and an image-side surface 532, wherein the object-side surface 531 of the third lens 530 is convex near the optical axis 500, the image-side surface 532 of the third lens 530 is concave near the optical axis 500, and the object-side surface 531 and image-side surface 532 both are aspheric.

The fourth lens 540 with positive refractive power is made of a plastic material and includes an object-side surface 541 and an image-side surface 542, wherein the object-side surface 541 of the fourth lens 540 is convex near the optical axis 500, the image-side surface 542 of the fourth lens 540 is concave near the optical axis 500, and the object-side surface 541 and image-side surface 542 both are aspheric.

The fifth lens 550 with positive refractive power is made of a plastic material and includes an object-side surface 551 and an image-side surface 552, wherein the object-side surface 551 of the fifth lens 550 is concave near the optical axis 500, the image-side surface 552 of the fifth lens 550 is convex near the optical axis 500, and the object-side surface 551 and image-side surface 552 both are aspheric.

The sixth lens 560 with positive refractive power is made of a plastic material and includes an object-side surface 561 and an image-side surface 562, wherein the object-side surface 561 of the sixth lens 560 is convex near the optical axis 500, the image-side surface 562 of the sixth lens 560 is concave near the optical axis 500, and the object-side surface 561 and image-side surface 562 both are aspheric.

The IR-cut filter 580 is made of glass and is disposed between the sixth lens and the image plane 590 without affecting a focal length of the optical lens assembly. It can be understood that the IR-cut filter 580 may also be formed on the surface of the above-mentioned lens, and the IR-cut filter 580 may also be made of other materials.

Refer to Table 9 and Table 10 below.

TABLE 9

Fifth embodiment
f (focal length) = 2.48 mm, Fno (f-number) = 2.08, FOV (field of view 2ω) = 121.8 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −6.657 | (ASP) | 0.559 | Plastic | 1.54 | 56.00 | −6.65 |
| 2 | | 8.244 | (ASP) | 1.370 | | | | |
| 3 | Stop | Infinity | | −0.001 | | | | |
| 4 | Second lens | 4.233 | (ASP) | 0.748 | Plastic | 1.54 | 56.00 | 3.63 |
| 5 | | −3.490 | (ASP) | 0.335 | | | | |
| 6 | Third lens | 6.114 | (ASP) | 0.350 | Plastic | 1.67 | 19.24 | −11.73 |
| 7 | | 3.375 | (ASP) | 0.178 | | | | |
| 8 | Fourth lens | 7.258 | (ASP) | 0.817 | Plastic | 1.54 | 56.00 | 16.84 |
| 9 | | 33.065 | (ASP) | 0.240 | | | | |
| 10 | Fifth lens | −18.426 | (ASP) | 0.971 | Plastic | 1.54 | 56.00 | 2.35 |
| 11 | | −1.221 | (ASP) | 0.030 | | | | |
| 12 | Sixth lens | 1.824 | (ASP) | 0.603 | Plastic | 1.67 | 19.24 | −3.03 |
| 13 | | 0.837 | (ASP) | 0.783 | | | | |
| 14 | IR-cut filter | Infinity | | 0.210 | Glass | 1.52 | 64.20 | |
| 15 | | Infinity | | 0.388 | | | | |
| 16 | Image plane | Infinity | | — | | | | |

Reference wavelength 555 nm

TABLE 10

Aspheric coefficient

| | Surface | | | | | |
|---|---|---|---|---|---|---|
| | 1 | 2 | 4 | 5 | 6 | 7 |
| K: | −1.5712E+01 | −3.0366E+01 | −1.0307E+01 | 7.0145E+00 | −9.0121E+01 | −8.6537E+00 |
| A2: | 0.0000E+00 | 0.0000E+00 | 0.0000E+00 | 0.0000E+00 | 0.0000E+00 | 0.0000E+00 |
| A4: | 1.0224E−01 | 1.3200E−01 | −9.1352E−03 | −2.3183E−02 | −5.8767E−02 | −6.5449E−02 |
| A6: | −5.2837E−02 | 6.2017E−02 | 7.7853E−02 | −2.0264E−01 | 1.8018E−02 | 7.2163E−02 |
| A8: | 2.6370E−02 | −3.1371E−01 | −8.1285E−01 | 1.1093E+00 | 1.3592E−01 | −6.9672E−02 |
| A10: | −9.8536E−03 | 5.9999E−01 | 3.7139E+00 | −3.7723E+00 | 1.3592E−01 | 8.6166E−03 |
| A12: | 2.5811E−03 | −6.6318E−01 | −1.0805E+01 | 7.9248E+00 | −4.9305E−02 | 5.0500E−02 |
| A14: | −4.4214E−04 | 4.5712E−01 | 1.9699E+01 | −1.0358E+01 | −2.1188E−02 | −5.0493E−02 |
| A16: | 4.4419E−05 | −1.9210E−01 | −2.1740E+01 | 8.1628E+00 | 2.1117E−02 | 2.2171E−02 |
| A18: | −2.1919E−06 | 4.5070E−02 | 1.3095E+01 | −3.5470E+00 | −4.4742E−03 | −4.7660E−03 |
| A20: | 3.1585E−08 | −4.5503E−03 | −3.2742E+00 | 6.4998E−01 | −5.5597E−05 | 4.0335E−04 |

| | Surface | | | | | |
|---|---|---|---|---|---|---|
| | 8 | 9 | 10 | 11 | 12 | 13 |
| K: | −5.8593E+01 | −4.6583E+01 | −9.2741E+00 | −1.5017E+00 | −1.1465E+01 | −3.6689E+00 |
| A2: | 0.0000E+00 | 0.0000E+00 | 0.0000E+00 | 0.0000E+00 | 0.0000E+00 | 0.0000E+00 |
| A4: | −6.9354E−03 | 8.0513E−02 | 1.7286E−01 | 1.1150E−01 | −1.6759E−02 | −7.8482E−02 |
| A6: | −8.2831E−02 | −2.2980E−01 | −2.2598E−01 | −3.0914E−01 | −8.4163E−02 | 3.3825E−02 |
| A8: | 2.3538E−01 | 2.2113E−01 | 1.4778E−01 | −6.3798E−02 | 8.4717E−02 | −1.0214E−02 |
| A10: | −2.9748E−01 | −1.4239E−01 | −6.1184E−02 | 9.3573E−02 | −4.3131E−02 | 2.0180E−03 |
| A12: | 2.1726E−01 | 6.3427E−02 | 1.2716E−02 | −5.9466E−02 | 1.3128E−02 | −2.5326E−04 |
| A14: | −9.7487E−02 | −1.8576E−02 | 3.2505E−05 | 2.0815E−02 | −2.5034E−03 | 1.8485E−05 |
| A16: | 2.6318E−02 | 3.2250E−03 | −5.4444E−04 | −4.1031E−03 | 2.9206E−04 | −5.8165E−07 |
| A18: | −3.8814E−03 | −2.7524E−04 | 9.8531E−05 | 4.2555E−04 | −1.8749E−05 | −8.5828E−09 |
| A20: | 2.3736E−04 | 7.2504E−06 | −6.2590E−06 | −1.8029E−05 | 4.9547E−07 | 7.9352E−10 |

In the fifth embodiment, an aspheric curve equation is expressed as the form in the first embodiment. In addition, definitions of parameters in the table below are all the same as those of parameters in the first embodiment, and are not repeated herein.

Referring to Table 9 and Table 10, the following data may be calculated:

| Fifth embodiment | | | |
|---|---|---|---|
| f/f1 | −0.37 | TL/IMH | 1.89 |
| HFOV/(IMH*Fno*TL) | 0.96 | (TL-BFL)/f | 2.50 |
| R1/R2 | −0.81 | IMH/(CT1 + CT3) | 4.40 |
| CT3*(R5/R6) | 0.63 | (f2/CT2)-(f5/CT5) | 2.43 |
| f/f6 | −0.82 | vd4-vd3 | 36.76 |
| f3*f6/f1 | −5.34 | \|vd5/f5-vd6/f6\| | 30.20 |
| f4/(f3*f5) | −0.61 | f1/f2 | −1.84 |
| (CT4 + CT5)/(CT3 + CT6) | 1.88 | f3/f5 | −5.00 |
| (CT1 + CT6)/T1S | 0.85 | IMH [mm] | 4.00 |

Sixth Embodiment

Figure 6A:
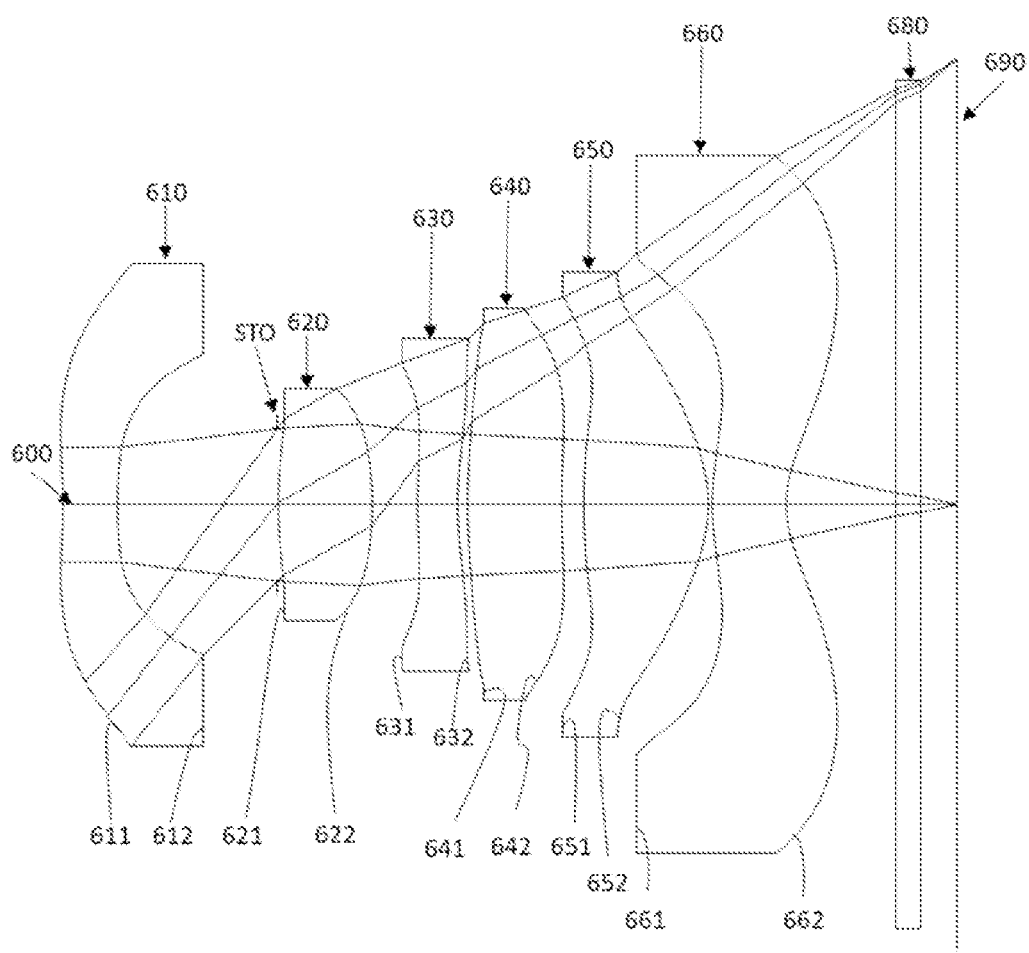
FIG. 6A is a schematic view of an optical lens assembly according to a sixth embodiment of the present disclosure.
Figure 6B:
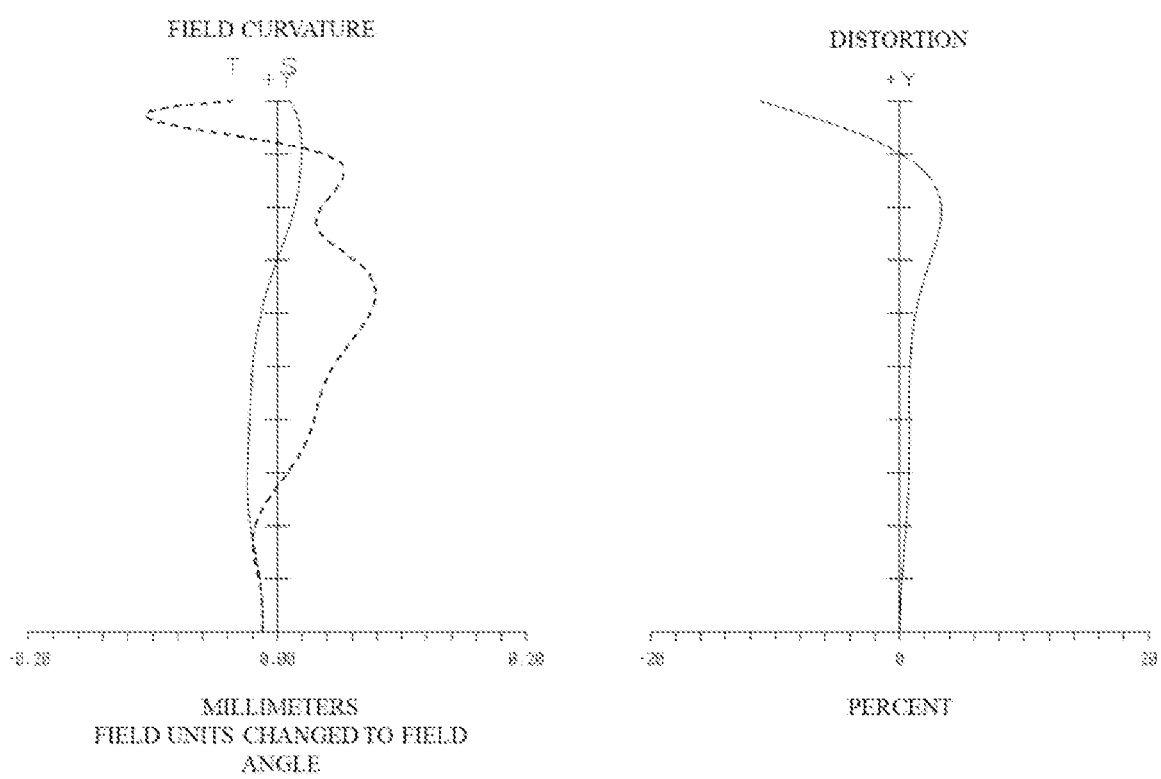
FIG. 6B sequentially shows a field curvature curve and a distortion curve of the optical lens assembly of the sixth embodiment.

FIG. 6A is a schematic view of an optical lens assembly according to the sixth embodiment of the present disclosure. FIG. 6B sequentially shows a field curvature curve and a distortion curve of the optical lens assembly according to the sixth embodiment. It can be seen from FIG. 6A that the optical lens assembly includes, in order from an object-side to an image-side: a first lens 610, a stop, a second lens 620, a third lens 630, a fourth lens 640, a fifth lens 650, a sixth lens 660, an IR-cut (infrared-cut) filter 680, and an image plane 690. A total quantity of lenses with refractive power in the optical lens assembly is six, but not limited thereto.

The first lens 610 with negative refractive power is made of a plastic material and includes an object-side surface 611 and an image-side surface 612, wherein the object-side surface 611 of the first lens 610 is concave near an optical axis 600, the image-side surface 612 of the first lens 610 is concave near the optical axis 600, and the object-side surface 611 and image-side surface 612 both are aspheric.

The second lens 620 with positive refractive power is made of a plastic material and includes an object-side surface 621 and an image-side surface 622, wherein the object-side surface 621 of the second lens 620 is convex near the optical axis 600, the image-side surface 622 of the second lens 620 is convex near the optical axis 600, and the object-side surface 621 and image-side surface 622 both are aspheric.

The third lens 630 with negative refractive power is made of a plastic material and includes an object-side surface 631 and an image-side surface 632, wherein the object-side surface 631 of the third lens 630 is convex near the optical axis 600, the image-side surface 632 of the third lens 630 is concave near the optical axis 600, and the object-side surface 631 and image-side surface 632 both are aspheric.

The fourth lens 640 with positive refractive power is made of a plastic material and includes an object-side surface 641 and an image-side surface 642, wherein the object-side surface 641 of the fourth lens 640 is convex near the optical axis 600, the image-side surface 642 of the fourth lens 640 is concave near the optical axis 600, and the object-side surface 641 and image-side surface 642 both are aspheric.

The fifth lens 650 with positive refractive power is made of a plastic material and includes an object-side surface 651 and an image-side surface 652, wherein the object-side surface 651 of the fifth lens 650 is convex near the optical axis 600, the image-side surface 652 of the fifth lens 650 is convex near the optical axis 600, and the object-side surface 651 and image-side surface 652 both are aspheric.

The sixth lens 660 with positive refractive power is made of a plastic material and includes an object-side surface 661 and an image-side surface 662, wherein the object-side surface 661 of the sixth lens 660 is convex near the optical axis 600, the image-side surface 662 of the sixth lens 660 is concave near the optical axis 500, and the object-side surface 661 and image-side surface 662 both are aspheric.

The IR-cut filter 680 is made of glass and is disposed between the sixth lens and the image plane 690 without affecting a focal length of the optical lens assembly. It can be understood that the IR-cut filter 680 may also be formed on the surface of the above-mentioned lens, and the IR-cut filter 680 may also be made of other materials.

Refer to Table 11 and Table 12 below.

TABLE 11

Sixth embodiment
f (focal length) = 2.29 mm, Fno (f-number) = 2.25, FOV (field of view 2ω) = 125.9 deg. (degree)

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | −4.727 | (ASP) | 0.470 | Plastic | 1.54 | 56.00 | −4.78 |
| 2 | | 6.031 | (ASP) | 1.378 | | | | |
| 3 | Stop | Infinity | | 0.011 | | | | |
| 4 | Second lens | 4.449 | (ASP) | 0.806 | Plastic | 1.54 | 56.00 | 3.70 |
| 5 | | −3.469 | (ASP) | 0.383 | | | | |
| 6 | Third lens | 5.351 | (ASP) | 0.349 | Plastic | 1.68 | 18.15 | −13.78 |
| 7 | | 3.329 | (ASP) | 0.087 | | | | |
| 8 | Fourth lens | 5.815 | (ASP) | 0.814 | Plastic | 1.54 | 56.00 | 16.87 |
| 9 | | 14.984 | (ASP) | 0.186 | | | | |
| 10 | Fifth lens | 13.487 | (ASP) | 1.068 | Plastic | 1.54 | 56.00 | 2.31 |
| 11 | | −1.354 | (ASP) | 0.033 | | | | |
| 12 | Sixth lens | 2.368 | (ASP) | 0.639 | Plastic | 1.67 | 19.24 | −3.19 |
| 13 | | 1.006 | (ASP) | 0.945 | | | | |
| 14 | IR-cut filter | Infinity | | 0.210 | Glass | 1.52 | 64.20 | |
| 15 | | Infinity | | 0.314 | | | | |
| 16 | Image plane | Infinity | | — | | | | |

Reference wavelength 555 nm

TABLE 12

Aspheric coefficient

| | Surface | | | | | |
|---|---|---|---|---|---|---|
| | 1 | 2 | 4 | 5 | 6 | 7 |
| K: | −8.3205E+01 | 1.7702E+01 | −1.8840E+01 | 7.2364E+00 | −9.1629E+01 | −1.9521E+01 |
| A2: | 0.0000E+00 | 0.0000E+00 | 0.0000E+00 | 0.0000E+00 | 0.0000E+00 | 0.0000E+00 |
| A4: | 1.0351E−01 | 2.0406E−01 | −1.9359E−02 | −5.9501E−02 | −6.3217E−02 | −4.6657E−02 |
| A6: | −4.3761E−02 | −4.8878E−02 | 3.4525E−01 | −1.1981E−01 | 9.3230E−03 | −5.6874E−03 |
| A8: | 1.3302E−02 | −6.2496E−02 | −4.2886E+00 | 6.3796E−01 | 8.5353E−01 | 4.3348E−02 |
| A10: | −3.1640E−04 | 1.2923E−01 | 2.7310E+01 | −2.2587E+00 | 8.5353E−01 | −6.3507E−02 |
| A12: | −1.5892E−03 | −7.0844E−02 | −1.0895E+02 | 5.0666E+00 | −1.2773E+00 | 4.1755E−02 |
| A14: | 6.7838E−04 | −7.2464E−03 | 2.7468E+02 | −7.2204E+00 | 1.1975E+00 | −3.5808E−03 |
| A16: | −1.3605E−04 | 2.3456E−02 | −4.2414E+02 | 6.2983E+00 | −6.9236E−01 | −9.7381E−03 |
| A18: | 1.3694E−05 | −7.9244E−03 | 3.6476E+02 | −3.0739E+00 | 2.2508E−01 | 4.8294E−03 |
| A20: | −5.5091E−07 | 4.9503E−04 | −1.3341E+02 | 6.4351E−01 | −3.1283E−02 | −7.1504E−04 |

| | Surface | | | | | |
|---|---|---|---|---|---|---|
| | 8 | 9 | 10 | 11 | 12 | 13 |
| K: | −5.7903E+01 | −4.9091E+01 | −8.9912E+01 | −1.2997E+00 | −1.6300E+01 | −4.3253E+00 |
| A2: | 0.0000E+00 | 0.0000E+00 | 0.0000E+00 | 0.0000E+00 | 0.0000E+00 | 0.0000E+00 |
| A4: | −1.0628E−02 | 9.8656E−02 | 1.7239E−01 | 1.1748E−01 | −3.4738E−02 | −5.9410E−02 |
| A6: | −1.2738E−01 | −3.1042E−01 | −2.5076E−01 | −6.4432E−03 | −2.1978E−02 | 9.2006E−03 |
| A8: | 4.1445E−01 | 2.9268E−01 | 1.5044E−01 | −1.0673E−01 | −2.8616E−02 | 4.7488E−03 |
| A10: | −5.7984E−01 | −1.5008E−01 | −5.3701E−02 | 1.1322E−01 | 5.5778E−02 | −3.2047E−03 |
| A12: | 4.6493E−01 | 3.8046E−02 | 1.4383E−02 | −5.7068E−02 | −3.5688E−02 | 8.7235E−04 |
| A14: | −2.2820E−01 | 2.7867E−04 | −4.9954E−03 | 1.5764E−02 | 1.1919E−02 | −1.3445E−04 |
| A16: | 6.7546E−02 | −3.0669E−03 | 1.7394E−03 | −2.3126E−03 | −2.2418E−03 | 1.2214E−05 |
| A18: | −1.1014E−02 | 7.9335E−04 | −3.2687E−04 | 1.5088E−04 | 2.2551E−04 | −6.1187E−07 |
| A20: | 7.5590E−04 | −6.7432E−05 | 2.2768E−05 | −1.9859E−06 | −9.4369E−06 | 1.3069E−08 |

In the sixth embodiment, an aspheric curve equation is expressed as the form in the first embodiment. In addition, definitions of parameters in the table below are all the same as those of parameters in the first embodiment, and are not repeated herein.

Referring to Table 11 and Table 12, the following data may be calculated:

| Sixth embodiment | | | |
|---|---|---|---|
| f/f1 | −0.48 | TL/IMH | 1.92 |
| HFOV/(IMH*Fno*TL) | 0.91 | (TL-BFL)/f | 2.71 |
| R1/R2 | −0.78 | IMH/(CT1 + CT3) | 4.88 |
| CT3*(R5/R6) | 0.56 | (f2/CT2)-(f5/CT5) | 2.43 |
| f/f6 | −0.72 | vd4-vd3 | 37.85 |
| f3*f6/f1 | −9.20 | \|vd5/f5-vd6/f6\| | 30.27 |
| f4/(f3*f5) | −0.53 | f1/f2 | −1.29 |
| (CT4 + CT5)/(CT3 + CT6) | 1.90 | f3/f5 | −5.97 |
| (CT1 + CT6)/T1S | 0.80 | IMH [mm] | 4.00 |

Seventh Embodiment

Figure 7:
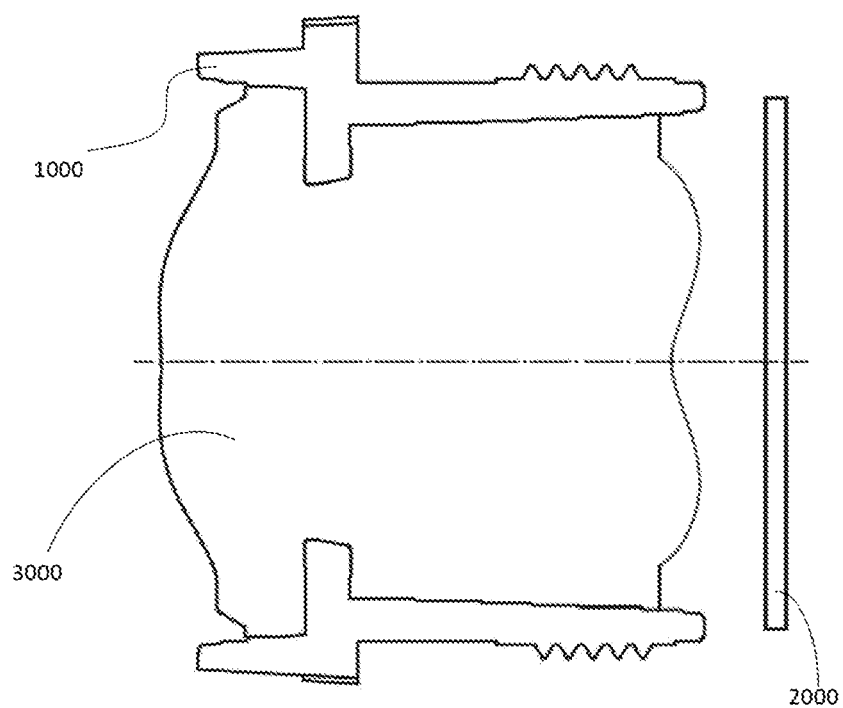
FIG. 7 is a schematic view of a photographing module according to a seventh embodiment of the present disclosure.

FIG. 7 is schematic view of a photographing module according to the seventh embodiment of the present disclosure, and the photographing module includes a lens barrel 1000, an optical lens assembly 3000 disposed in the lens barrel 1000, and an image sensor 2000 being an electronic photosensitive element and disposed on an image plane of the optical lens assembly. The optical lens assembly is the same as the optical lens assembly described in any one of the first embodiment to the sixth embodiment.

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly and the photographing module provided in the present disclosure can be further applied to an optical system requiring high image resolution and an ultra-wide angle as required, have the resolving power up to 50 M, and are designed with an optical aperture of 2.2 or 2.0, which can be widely applied to electronic image systems such as a mobile phone, a notebook computer, a digital tablet, a mobile device, a digital camera or a vehicle photographing device.

What is claimed is:

1. An optical lens assembly, in order from an object-side to an image-side, comprising:
    a first lens with negative refractive power, comprising an object-side surface and an image-side surface, the object-side surface of the first lens being concave near an optical axis, and the image-side surface of the first lens being concave near the optical axis;
    a stop;
    a second lens with positive refractive power, comprising an object-side surface and an image-side surface, the object-side surface of the second lens being convex near the optical axis, and the image-side surface of the second lens being convex near the optical axis;
    a third lens with negative refractive power, comprising an object-side surface and an image-side surface, the object-side surface of the third lens being convex near the optical axis, and the image-side surface of the third lens being concave near the optical axis;
    a fourth lens with positive refractive power, comprising an object-side surface and an image-side surface, the object-side surface of the fourth lens being convex near the optical axis, and the image-side surface of the fourth lens being concave near the optical axis;
    a fifth lens with positive refractive power, comprising an object-side surface and an image-side surface, the image-side surface of the fifth lens being convex near the optical axis; and
    a sixth lens with negative refractive power, comprising an object-side surface and an image-side surface, the object-side surface of the sixth lens being convex near the optical axis, and the image-side surface of the sixth lens being concave near the optical axis;
    wherein half of a maximum field of view of the optical lens assembly is HFOV, an f-number of the optical lens assembly is Fno, a distance from the object-side surface of the first lens to an image plane along the optical axis is TL, a maximum image height of the optical lens assembly is IMH, a focal length of the optical lens assembly is f, a focal length of the first lens is f1, a curvature radius of the object-side surface of the first lens is R1, a curvature radius of the image-side surface of the first lens is R2, and the following conditions are satisfied:

$0.73 < HFOV/(IMH*Fno*TL) < 1.67$, $-0.58 < f/f1 < -0.30$, and $-1.24 < R1/R2 < -0.31$.

2. The optical lens assembly according to claim 1, wherein a central thickness of the third lens along the optical axis is CT3, a curvature radius of the object-side surface of the third lens is R5, a curvature radius of the image-side surface of the third lens is R6, and the following condition is satisfied: $0.31 < CT3*(R5/R6) < 0.76$.

3. The optical lens assembly according to claim 1, wherein the focal length of the optical lens assembly is f, a focal length of the sixth lens is f6, and the following condition is satisfied: $-1.09 < f/f6 < -0.58$.

4. The optical lens assembly according to claim 1, wherein the focal length of the first lens is f1, a focal length of the third lens is f3, a focal length of the sixth lens is f6, and the following condition is satisfied:

$-11.04 < f3*f6/f1 < -3.24$.

5. The optical lens assembly according to claim 1, wherein a focal length of the third lens is f3, a focal length of the fourth lens is f4, a focal length of the fifth lens is f5, and the following condition is satisfied: $-3.68 < f4/(f3*f5) < -0.42$.

6. The optical lens assembly according to claim 1, wherein a central thickness of the third lens along the optical axis is CT3, a central thickness of the fourth lens along the optical axis is CT4, a central thickness of the fifth lens along the optical axis is CT5, a central thickness of the sixth lens along the optical axis is CT6, and the following condition is satisfied: $1.50 < (CT4+CT5)/(CT3+CT6) < 2.58$.

7. The optical lens assembly according to claim 1, wherein a central thickness of the first lens along the optical axis is CT1, a central thickness of the sixth lens along the optical axis is CT6, a distance from the image-side surface of the first lens to the stop along the optical axis is T1S, and the following condition is satisfied: 0.54<(CT1+CT6)/T1S<1.10.

8. The optical lens assembly according to claim 1, wherein the distance from the object-side surface of the first lens to the image plane along the optical axis is TL, the maximum image height of the optical lens assembly is IMH, and the following condition is satisfied: 1.52<TL/IMH <2.34.

9. The optical lens assembly according to claim 1, wherein the distance from the object-side surface of the first lens to the image plane along the optical axis is TL, a distance from the image-side surface of the sixth lens to the image plane along the optical axis is BFL, the focal length of the optical lens assembly is f, and the following condition is satisfied: 1.75<(TL−BFL)/f<3.27.

10. The optical lens assembly according to claim 1, wherein the maximum image height of the optical lens assembly is IMH, a central thickness of the first lens along the optical axis is CT1, a central thickness of the third lens along the optical axis is CT3, and the following condition is satisfied: 3.52<IMH/(CT1+CT3)<6.15.

11. The optical lens assembly according to claim 1, wherein a central thickness of the second lens along the optical axis is CT2, a central thickness of the fifth lens along the optical axis is CT5, a focal length of the second lens is f2, a focal length of the fifth lens is f5, and the following condition is satisfied: 1.76< (f2/CT2)−(f5/CT5)<3.26.

12. The optical lens assembly according to claim 1, wherein an Abbe number of the third lens is vd3, an Abbe number of the fourth lens is vd4, and the following condition is satisfied: 29.4<vd4−vd3<45.4.

13. The optical lens assembly according to claim 1, wherein an Abbe number of the fifth lens is vd5, an Abbe number of the sixth lens is vd6, a focal length of the fifth lens is f5, a focal length of the sixth lens is f6, and the following condition is satisfied: 24.2<vd5/f5−vd6/f6|<48.5.

14. A photographing module, comprising:
a lens barrel;
an optical lens assembly disposed in the lens barrel; and
an image sensor disposed on an image plane of the optical lens assembly,
wherein the optical lens assembly, in order from an object side to an image side, comprising:
a first lens with negative refractive power, comprising an object-side surface and an image-side surface, the object-side surface of the first lens being concave near an optical axis, and the image-side surface of the first lens being concave near the optical axis;
a stop;
a second lens with positive refractive power, comprising an object-side surface and an image-side surface, the object-side surface of the second lens being convex near the optical axis, and the image-side surface of the second lens being convex near the optical axis;
a third lens with negative refractive power, comprising an object-side surface and an image-side surface, the object-side surface of the third lens being convex near the optical axis, and the image-side surface of the third lens being concave near the optical axis;
a fourth lens with positive refractive power, comprising an object-side surface and an image-side surface, the object-side surface of the fourth lens being convex near the optical axis, and the image-side surface of the fourth lens being concave near the optical axis;
a fifth lens with positive refractive power, comprising an object-side surface and an image-side surface, the image-side surface of the fifth lens being convex near the optical axis; and
a sixth lens with negative refractive power, comprising an object-side surface and an image-side surface, the object-side surface of the sixth lens being convex near the optical axis, and the image-side surface of the sixth lens being concave near the optical axis;
wherein half of a maximum field of view of the optical lens assembly is HFOV, an f-number of the optical lens assembly is Fno, a distance from the object-side surface of the first lens to an image plane along the optical axis is TL, a maximum image height of the optical lens assembly is IMH, a focal length of the optical lens assembly is f, a focal length of the first lens is f1, a curvature radius of the object-side surface of the first lens is R1, a curvature radius of the image-side surface of the first lens is R2, and the following conditions are satisfied:

$0.73 < HFOV/(IMH*Fno*TL) < 1.67, -0.58 < f/f1 < -0.30,$ and $-1.24 < R1/R2 < -0.31.$ 15. The photographing module according to claim 14, wherein a central thickness of the third lens along the optical axis is CT3, a central thickness of the fourth lens along the optical axis is CT4, a central thickness of the fifth lens along the optical axis is CT5, a central thickness of the sixth lens along the optical axis is CT6, and the following condition is satisfied: 1.50< (CT4+CT5)/(CT3+CT6)<2.58.

16. The photographing module according to claim 14, wherein a central thickness of the first lens along the optical axis is CT1, a central thickness of the sixth lens along the optical axis is CT6, a distance from the image-side surface of the first lens to the stop along the optical axis is T1S, and the following condition is satisfied: 0.54<(CT1+CT6)/T1S<1.10.

17. The photographing module according to claim 14, wherein the distance from the object-side surface of the first lens to the image plane along the optical axis is TL, the maximum image height of the optical lens assembly is IMH, and the following condition is satisfied: 1.52<TL/IMH <2.34.

18. The photographing module according to claim 14, wherein the distance from the object-side surface of the first lens to the image plane along the optical axis is TL, a distance from the image-side surface of the sixth lens to the image plane along the optical axis is BFL, the focal length of the optical lens assembly is f, and the following condition is satisfied: 1.75<(TL−BFL)/f<3.27.

19. The photographing module according to claim 14, wherein a central thickness of the second lens along the optical axis is CT2, a central thickness of the fifth lens along the optical axis is CT5, a focal length of the second lens is f2, a focal length of the fifth lens is f5, and the following condition is satisfied: 1.76<(f2/CT2)−(f5/CT5)<3.26.

* * * * *